United States Patent
Casalino et al.

(10) Patent No.: US 12,312,100 B2
(45) Date of Patent: May 27, 2025

(54) ASSESSING VEHICLE NOISE

(71) Applicant: Dassault Systemes Americas Corp., Waltham, MA (US)

(72) Inventors: Damiano Casalino, Malmsheim (DE); Wouter Van der Velden, Rotterdam (NL)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 191 days.

(21) Appl. No.: 18/167,956

(22) Filed: Feb. 13, 2023

(65) Prior Publication Data
US 2024/0270410 A1    Aug. 15, 2024

(51) Int. Cl.
*B64F 5/60* (2017.01)
*G08G 5/32* (2025.01)
*G08G 5/50* (2025.01)
*G08G 5/55* (2025.01)

(52) U.S. Cl.
CPC ............ *B64F 5/60* (2017.01); *G08G 5/32* (2025.01); *G08G 5/50* (2025.01); *G08G 5/55* (2025.01)

(58) Field of Classification Search
CPC ...... B64F 5/60; G08G 5/0034; G08G 5/0047; G06F 30/20; G06F 30/28; G06F 30/15; G06F 2111/10; G06F 2119/10
See application file for complete search history.

(56) References Cited

U.S. PATENT DOCUMENTS 10,296,672 B2 * 5/2019 Rodriguez .............. G06F 30/23
2021/0125515 A1 * 4/2021 Mikic ...................... G09B 9/24

FOREIGN PATENT DOCUMENTS

JP     2018120553     8/2018

OTHER PUBLICATIONS

Ruiz et al.; Assessment of Quadrotor PID Control Algorithms using six-Degrees of Freedom CFD simulations; 2022 IEEE 61st Conference on Decision and Control (CDC) Dec. 6-9, 2022. Cancún, Mexico; pp. 3098-3103 (Year: 2022).*

(Continued)

*Primary Examiner* — Michael J Zanelli
(74) *Attorney, Agent, or Firm* — Hamilton, Brook, Smith & Reynolds, P.C.

(57) ABSTRACT

Embodiments assess vehicle noise. One such embodiment defines a computer-based model of a vehicle and automatically determines aerodynamic performance and propulsion performance of the vehicle based on the defined computer-based model. Responsively, a flight-dynamics simulation of the vehicle is performed using the determined aerodynamic performance and propulsion performance. Performing the flight-dynamics simulation produces flight status data. The flight status data is automatically down-sampled to generate a reduced dataset. A high-fidelity flow simulation of the vehicle is performed using the reduced dataset. Performing the high-fidelity flow simulation determines in-flight aerodynamic and aeroacoustic performance of the vehicle. In turn, based on the determined in-flight aerodynamic and aeroacoustic performance, noise physical characteristics of the vehicle are determined and an indication of the determined noise physical characteristics is stored in computer memory.

20 Claims, 12 Drawing Sheets

(56) References Cited

OTHER PUBLICATIONS

Casalino, D., et al., "Aeroacoustic Analysis of Urban Air Operations using the LB/VLES Method", 25th AIAA/CEAS Aeroacoustics Conference, Netherlands, (2019).
Casalino, D., et al., "Community Noise of Urban Air Transportation Vehicles", American Institute of Aeronautics and Astronautics, (2019).
Van der Velden, W., et al., "Flight and Noise Assessment of an eVTOL Vehicle using a Multi-Fidelity Model-Based System Engineering Methodology," Delft International Conference on Urban Air-Mobility, Mar. 2021, pp. 9.
Yunusi, F., "Toward inclusion of atmospheric effects in the aircraft community noise predictions," The Journal of Acoustical Society of America, vol. 150, Issue 2, Aug. 2021, pp. 759-768.

\* cited by examiner

Phase D: High-Fidelity Aerodynamics and Aeroacoustics

Input:
- Propulsion system geometry
- Airframe geometry
- Downsampled flight conditions

Output:
For every flight condition:
- Rotor thrust and torque coefficients
- Airframe aerodynamic coefficients
- Noise Hemisphere Database (NHD)

Flow integration surface used by optydb_fwhfreq to compute the NHD

ASSESSING VEHICLE NOISE

BACKGROUND

A number of existing product and simulation systems are offered on the market for the design and simulation of objects, e.g., vehicles. Such systems typically employ computer aided design (CAD) and computer aided engineering (CAE) programs. These systems allow a user to construct, manipulate, and simulate complex three-dimensional models of objects or assemblies of objects. These CAD and CAE systems provide a model representation of objects, e.g., real-world objects, using edges or lines, in certain cases with faces. Lines, edges, faces, or polygons may be represented in various manners, e.g. non-uniform rational basis-splines (NURBS).

Such systems manage parts or assemblies of parts of modeled objects, which are mainly specifications of geometry. In particular, CAD files contain specifications, from which geometry is generated. From geometry, a three-dimensional CAD model or model representation is generated. Specifications, geometries, and CAD models/representations may be stored in a single CAD file or multiple CAD files. CAD or other such CAE systems include graphic tools for visually representing the modeled objects as represented in 3-dimensional space to designers; these tools are dedicated to the display of complex real-world objects. For example, an assembly may contain thousands of parts.

The advent of CAD and CAE systems allows for a wide range of representation possibilities, such as CAD models, for objects. Computer-based models may be programmed in such a way that the model has the properties (e.g., physical, material, or other physics-based) of the underlying real-world object or objects that the model represents. Example properties include stiffness (ratio of force to displacement), plasticity (irreversible strain), and viscosity (resistance to flow of one layer over an adjacent layer), amongst others. When a CAD or other such computer-based model as is known in the art, is programmed in such a way, it may be used to perform simulations of the object that the model represents. For example, a mesh-based model may be used to represent the interior cavity of a vehicle, the acoustic fluid surrounding a structure, or any number of real-world objects. Moreover, CAD and CAE systems, along with computer-based models, can be utilized to simulate engineering systems, such as real-world physical systems, e.g., cars, airplanes, buildings, and bridges, amongst other examples. Further, CAE systems can be employed to simulate any variety and combination of behaviors of these physics based systems, such as noise and vibration.

SUMMARY

Transportation and commuting is a burgeoning field of interest as populations continue to grow. A solution to modernize transportation and alleviate congestion is the use of flight vehicles, e.g., electric vertical take-off and landing (eVTOL) vehicles. While eVTOLs provide a promising solution to modern transportation problems, little is known about the operation of such vehicles. Embodiments provide solutions to this problem. In particular, embodiments assess the noise generated by vehicles, e.g., eVTOLs, in operational conditions.

One such embodiment is directed to a computer-implemented method for determining vehicle noise physical characteristics, such as an optimal flight path. According to an embodiment, the method begins by defining a computer-based model of a vehicle and automatically determining aerodynamic performance and propulsion performance of the vehicle based on the defined computer-based model. Responsively, a flight-dynamics simulation of the vehicle is performed using the determined aerodynamic performance and propulsion performance. According to an embodiment, solving the flight-dynamics simulation enables tracking a dynamic equilibrium condition at each time step. Performing the flight-dynamics simulation produces flight status data, e.g., flight trajectory data. According to an embodiment, during a flight-dynamics simulation, a set of flight conditions, e.g., vehicle velocity, angle of attack, rotor RPM, etc., which determine the "flight status", are saved on computer disk memory at a given time rate, e.g. every 0.05 seconds of physical flight time. Once the flight mission is completed, the ensemble of flight statuses is considered the "flight envelope." To continue, the method automatically down-samples the flight status data, i.e., "flight envelope," in an innovative way to generate a reduced dataset, e.g., of flight conditions. In turn, a high-fidelity flow simulation (which may be a Computational Fluid Dynamics (CFD) simulation) of the vehicle is performed using the reduced dataset. Moreover, it is noted that embodiments may perform multiple such high-fidelity simulations. By performing the high-fidelity flow simulation, the in-flight aerodynamic and aeroacoustic performance of the vehicle are determined. Thus, aerodynamic and aeroacoustic performance of the vehicle are determined for a reduced set of representative flight conditions. To continue, noise physical characteristics of the vehicle are determined based on the determined in-flight aerodynamic and aeroacoustic performance, and an indication of the determined noise physical characteristics is stored in computer memory. According to an embodiment, performing a high-fidelity flow simulation and determining noise physical characteristics are automatically implemented by one or more digital processors. In embodiments the computer-based model of the vehicle may be user-interactively defined. Further, all steps of the method embodiments may be automatically performed in an automatic workflow implemented by one or more processors.

Another embodiment creates at least one of a propulsion look-up table and an aerodynamic look-up table. According to an embodiment, look-up tables of rotor thrust and torque coefficients are created for different values of rotor RPM and advance ratio J, which may be determined from geometry of a vehicle. These two tables, rotor thrust and torque coefficients, form the propulsion performance look-up table and constitute low-fidelity rotor performance input used by a flight dynamics model. In another embodiment, the aerodynamic performance of the vehicle is determined based on the defined computer-based model by isolating an airframe of the vehicle from the defined computer-based model, including the aerodynamic control surfaces, and determining aerodynamic performance parameters from the isolated airframe and control surfaces. In turn, look-up tables of aerodynamic force coefficients are created for different values of flow angles and different values of deflection angles of the various control surfaces. These aerodynamic force coefficient look-up tables form the aerodynamic look-up table and constitute the low-fidelity aerodynamic performance input used by a flight dynamics model.

An embodiment defines the computer-based model of the vehicle by importing a file containing a digitized representation of geometry of the vehicle. Another embodiment determines propulsion performance of the vehicle based on the defined computer-based model by, first, isolating one or more rotors of the vehicle from the defined computer-based model and, second, determining rotor parameters from the isolated one or more rotors. In turn, a propulsion look-up table is searched based on the rotor parameters to determine the propulsion performance. Similarly, an embodiment determines aerodynamic performance of the vehicle based on the defined computer-based model by (1) isolating an airframe of the vehicle from the defined computer-based model, (2) determining aerodynamic parameters from the isolated airframe, and (3) searching an aerodynamic look-up table based on the aerodynamic parameters to determine the aerodynamic performance.

According to an embodiment, performing the flight-dynamics simulation of the vehicle includes defining a travel path. Such an embodiment simulates operation of the vehicle along the travel path using the determined propulsion performance and aerodynamic performance, for instance, to ensure equilibrium of forces. Simulating the operation, e.g., vehicle flight, produces flight status data at each of a plurality of time-steps and such data are stored in computer memory as the flight status data, i.e., flight envelope. An embodiment simulates operation of the vehicle along the travel path using the determined propulsion performance and aerodynamic performance by providing flight status data, which may include aerodynamic forces, for a given time-step to an auto-pilot controller. Responsively, control input for the vehicle is received from the auto-pilot controller and this received control input is used in the simulation to produce flight status data for a time-step subsequent to the given time-step.

In an embodiment the flight status data comprises values for each of a plurality of flight parameters over-time. Embodiments down-sample the flight status data to generate the reduced dataset by computing a multi-dimensional histogram using the values for each of the plurality of flight parameters over-time, wherein the multi-dimensional histogram indicates probability of conditions during flight. Such embodiments, for each non-zero-probability condition, determine a lower bound value and an upper bound value for each of the plurality of flight parameters. For each of the plurality of flight parameters, an average lower bound value and an average upper bound value is computed based on the determined lower bound value and determined upper bound value for each non-zero-probability condition. A subset of computed average lower bound values and average upper bound values is stored as the reduced dataset. Another embodiment determines the subset of the computed average lower bound values and average upper bound values based on the histogram indicated probability of conditions. Yet another embodiment identifies, based on the histogram, an event during the flight and determines the subset of the computed average lower bound values and average upper bound values based on the identified event.

According to an embodiment, the high-fidelity flow simulation is a computation fluid dynamics (CFD) simulation or other such fluid simulation known to those of skill in the art. Further, in another embodiment, for all flight/operational conditions belonging to the down-sampled dataset, high-fidelity CFD simulations are performed. Further, in an embodiment, performing the high-fidelity flow simulation of the vehicle comprises performing multiple high-fidelity flow simulations. In an embodiment, each high-fidelity flow simulation is performed using respective flight conditions from the reduced dataset, to determine in-flight aerodynamic and aeroacoustic performance of the vehicle for each of the respective flight conditions. An embodiment determines noise physical characteristics, e.g., in the far-field, of the vehicle for each of the respective flight conditions and, based on the determined noise physical characteristics of the vehicle for each of the respective flight conditions, selects given flight conditions, from amongst the respective flight conditions. Another embodiment determines noise physical characteristics, e.g. the acoustic spectrum and integrated noise levels in the far field, as a function of the ground distance, atmospheric conditions, and flight status selected from available sets of flight conditions.

Another embodiment collects real-world environment data from one or more sensors. Such an embodiment may perform multiple high-fidelity flow simulations using respective flight conditions, the reduced dataset, and the real-world environment data collected. Performing the simulations determines in-flight aerodynamic and aeroacoustic performance of the vehicle subject to the respective flight conditions and the real-world environment data. In turn, noise physical characteristics of the vehicle for each of the respective flight conditions, e.g., on the real-world environment, are determined. Then, based on the determined noise physical characteristics of the vehicle for each of the respective flight conditions, given flight conditions are selected from amongst the respective flight conditions. Further, selections can be based on noise or other desired performance indicators that are selected by one or more users. The vehicle is then controlled in accordance with the selected given flight conditions.

An embodiment determines noise physical characteristics of the vehicle at multiple on-ground locations during a flight. Such an embodiment determines the noise physical characteristics at the multiple on-ground locations based upon: (i) ground, i.e., terrain, topography at each on-ground location, (ii) aerodynamic performance of the vehicle at waypoints of the flight corresponding to each on-ground location, and (iii) aeroacoustic performance of the vehicle at the waypoints of the flight corresponding to each on-ground location.

In an embodiment, one or more high-fidelity flow simulations of the vehicle are performed using the reduced dataset. In turn, physical noise indicators are stored in computer memory for each flight condition determined from the one or more high-fidelity simulations. Using the stored physical noise indicators, noise at one or multiple on-ground locations along the flight path is computed. Such an embodiment can also identify optimal flight mission profiles based on on-ground noise or other performance indicators.

Another embodiment is directed to a system that includes a processor and a memory with computer code instructions stored thereon. In such an embodiment, the processor and the memory, with the computer code instructions, are configured to cause the system to implement any embodiments or combination of embodiments described herein.

In another embodiment, a computer program product includes a non-transitory computer-readable medium having computer-readable program instructions stored thereon. The instructions, when executed by a processor, cause the processor to implement any embodiments or combination of embodiments described herein.

Yet another embodiment conducts flight simulations and community noise assessment of vehicles by, first, importing a file containing a digitized representation of a three-dimensional vehicle geometry. Such an embodiment isolates the rotors, i.e., propellers, from the whole geometry and calculates propulsion performance using a low fidelity method. Such an embodiment also isolates the airframe from the whole geometry and calculates the aerodynamic performance using an automated coarse-mesh CFD simulation. The geometry and mass model is used to set-up a flight dynamic model that is employed to compute flight mechanics status of the vehicle along a prescribed path. Such an embodiment samples the flight status during the flight and, then, down-samples the flight envelope based on histograms to define representative flight conditions for high-fidelity aerodynamic and aeroacoustic CFD calculations. To continue, said high-fidelity full vehicle CFD simulations are performed to compute aerodynamic and propulsion performance and the noise on a hemisphere of microphones around the vehicle. Such an embodiment can repeat the flight simulation with previous or improved aerodynamic and propulsion coefficients and compute on-ground noise by far-field extrapolation of the previously computed noise hemisphere spectra.

In an embodiment, importing the file includes computing the mass and inertial moments of the vehicle parts using CAD software and computing rotor thrust and torque look-up tables by importing a digital representation of the rotor in the form of a stereolithography (STL) file or similar such format. Rotor thrust and torque look-up tables can also be computed from constructive parameters of the rotor exported via a CATIA® parametric model of the rotor. In embodiments, importing the file may also include computing aerodynamic forces on the airframe by importing a digital representation of the vehicle in the form of a STL file or similar such file.

An embodiment sets-up a flight dynamic model by connecting several Modelica modules in a graphical component-based software environment. In one such embodiment, the component-based software environment provides a variety of features including at least one of a world model, an atmosphere model, a terrain model, a vertiport model, a conventional aircraft flight dynamics model, and a multicopter rotor dynamics model, amongst other examples.

An embodiment sets up a flight dynamic model by connecting a Dymola® Dynamic Behavior Modeling (DBM) flight dynamic model with a flight controller (e.g., an autopilot) and Ground Control Station (GCS) to track and visualize a given flight trajectory. In another embodiment, setting-up the flight dynamic model includes searching look-up tables of force coefficients for a specific airframe and propulsion units of the vehicle being assessed.

In another aspect, embodiments down sample the flight envelope by averaging fast signals of flight parameters sampled every 0.05 s, over larger time windows, e.g., 0.5 s and computing histograms of all flight parameters and ranking the conditions accordingly. Embodiments may also identify "corner" events of the flight envelope. Further, embodiments, can define the most representative flight conditions for high-fidelity simulations.

In another aspect, performing the high-fidelity full vehicle CFD simulation includes automatically generating set up variants for different flight conditions and different settings of the control surfaces, such as flaps, elevators, ailerons etc., and values of the tilt rotor angles. Such an embodiment extracts constructive parameters, from the rotor geometry, that are needed to create partitions on the blade and sets up suitable mesh resolution regions around the rotor. Embodiments also schedule and manage multiple simulations on a High Performance Computing (HPC) system and label and store data for each flight condition.

Embodiments may also compute noise on the hemisphere (NHD) using an on-the-fly frequency-domain Ffowcs-Williams & Hawkings (FW-H) formulation that addresses wakes crossing the integration surface. Further, embodiments can use the aerodynamic and propulsion coefficients to train and improve the low-fidelity methods through machine learning techniques and heuristic approaches.

An embodiment performs on-ground noise calculations off-line by importing the complete flight trajectory and corresponding sequence of flight conditions. Another embodiment performs the noise calculation on-the-fly (also in real time), by using the last waypoint of the trajectory and corresponding flight parameters. Embodiments can also interpolate the noise hemisphere from the pre-computed NHD, based on the instantaneous flight parameters. Yet other embodiments apply Doppler effects corrections and apply ground reflection/absorption and atmospheric absorption in the far-field noise calculation at one or more microphone locations on ground. Embodiments also determine the on-ground microphone coordinates from a digital representation of the Earth topography based on the waypoint latitude/longitude coordinates and represent the coordinates as a carpet of microphones of user-defined dimensions that follows the on-ground projection of the vehicle during its flight.

As part of performing a flight mission analysis, an embodiment visualizes the vehicle and the noise in a realistic rendered scenario. Another embodiment extends the flight mission analysis framework to eVTOL life cycle management through the 3DEXPERIENCE® Requirement, Functional, Logical and Physical (RFLP) capabilities. This is a generic Model Based System Engineering framework which allows to manage the entire life cycle of the system by considering several disciplines and aspects of the vehicle design, manufacturing and maintenance.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
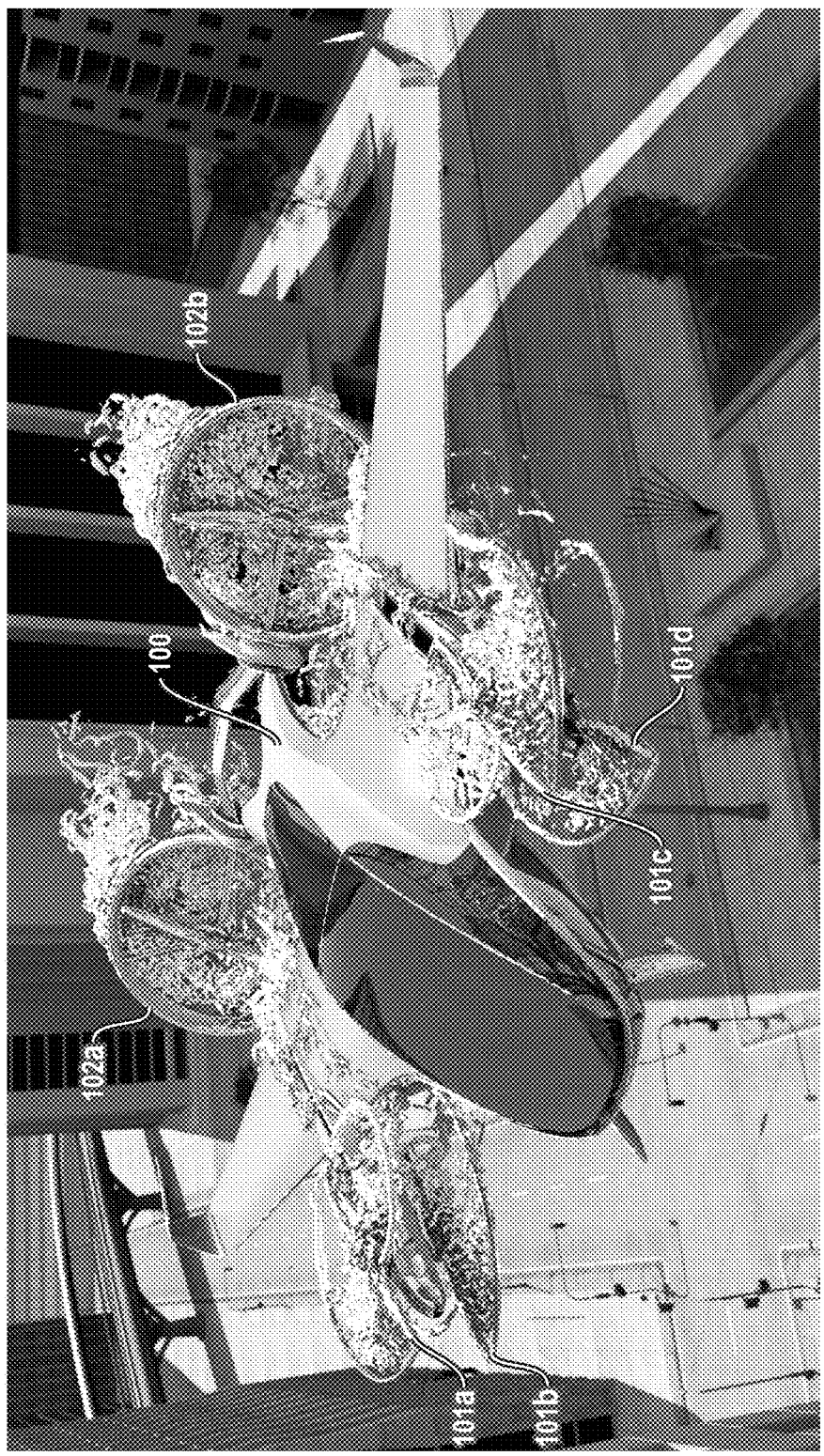
FIG. 1 depicts a CAD model of an eVTOL vehicle that can be assessed using embodiments.

A description of example embodiments follows.

Embodiments assess noise generated by vehicles, e.g., electric Vertical Take-Off and Landing (eVTOL) vehicles, in operational scenarios. It is noted that while embodiments are described herein in relation to eVTOLs, embodiments are not limited to assessing noise for eVTOLs and can be used to assess noise for any vehicle flight.

As populations in cities continue to grow, traffic is becoming increasingly problematic. Millions of hours are wasted on the road worldwide, resulting in personal and business-related losses. The combined usage of Air Taxi Vehicles (ATV), Personal Air Vehicles (PAVs) and delivery drones for small-size packages has the potential to radically improve commuter mobility and positively impact society, quality of life, and the environment. Therefore, the development of Urban Air Mobility (UAM) concepts, from vehicle design to traffic management, is attracting the interest of several stakeholders, including aircraft and car manufactures, regulators and agencies, research institutions and academia, amongst others. The rapid growth of this topic in terms of industrial investments, research and development efforts, and media coverage is typically referred to as the 3rd Aerospace Revolution.

However, before widespread adoption of such technology, challenges need to be overcome in the following areas: (i) vehicle, e.g., battery endurance and propulsion efficiency, noise and safety, (ii) manufacturing, e.g., series production of composite structures with aerospace quality standards, (iii) operation, e.g., a specific Air Traffic Management (ATM) system able to manage both manned/unmanned and guided/autonomous vehicles, (iv) regulations, e.g., in connection with certification, operation, and safety, (v) life-cycle management and maintenance, and (vi) recycling.

Considering the mutual interactions between the different disciplines involved in the design of safe and quiet flight systems, e.g., eVTOLs, it can be argued that new design paradigms at all levels, from conceptual to detailed full model designs, are needed. Closer to a helicopter than to a fixed-wing aircraft, the design of different systems is strictly connected with the aero-mechanical behavior of the vehicle. More specifically, due to the strong connection between the maneuver and on-ground perceived noise, and between installed power and trajectories, dynamic trim of the vehicle is a key element of any design and optimization process. Embodiments predict the impact of trajectories and maneuvers on the noise generated by vehicles. Embodiments can be implemented as part of a flight mission platform and can be operated in real-time to control and influence real-world operation of eVTOLs or such flight vehicles.

The optimization of take-off and landing procedures of an eVTOL vehicle is a difficult and interesting task due to the higher number of flight and operational control parameters compared to helicopters. A target mission profile under consideration by several stakeholders is a 60-mile air-shuttle between an airport and business city center. Analyses of the battery capacity reveal that lifting surfaces are required to limit the electric lift generation during take-off and landing and cover the target range. Therefore, the most viable eVTOL concepts are vehicles lifted by rotors that convert from a vertical to a horizontal axis thanks to tilting rotors and/or tilting lifting surfaces.

FIG. 1 shows an example of an eVTOL concept vehicle 100 for which the noise can be assessed using embodiments described herein. The example vehicle 100 comprises two front counter-rotating open rotors 101*a-b* and 101*c-d* and two rear shrouded counter-rotating tilting rotors 102*a-b*. The capability to tilt rotors and parts of the wing constitute an additional degree of freedom in the aero-mechanical and aeroacoustic optimization of a maneuver, making it a challenging geometry to work with for purposes of simulation and noise assessment.

In multi-rotor configurations, Blade-Vortex Interaction (BVI) phenomena can take place at certain flight conditions when the wake from one rotor is ingested by another rotor. As such, for this kind of architecture (vehicle 100), a low-noise procedure is one for which the occurrence of BVI conditions is minimized.

Electrical motors enable the usage of variable speed rotors. This allows adapting the rotational speed of rotors to different flight conditions so as to supply the required lift and thrust, while operating close to an optimal advance ratio, i.e. the ratio between the tip speed and freestream fluid speed. Compared to the control of the collective angle of a helicopter rotor blade, the rotational speed control can be used to better distribute the lift between the wings and the rotors during a conversion stage, i.e. from hover to cruise condition.

Based on these aforementioned factors, an eVTOL flight from point A to point B can be accomplished in many different ways, where some of the trajectories and operational parameters are noisier than others. A goal of embodiments is to evaluate the on-ground noise footprint of an eVTOL during its flight, by taking into account both aero-mechanical and aerodynamic effects.

Figure 2:
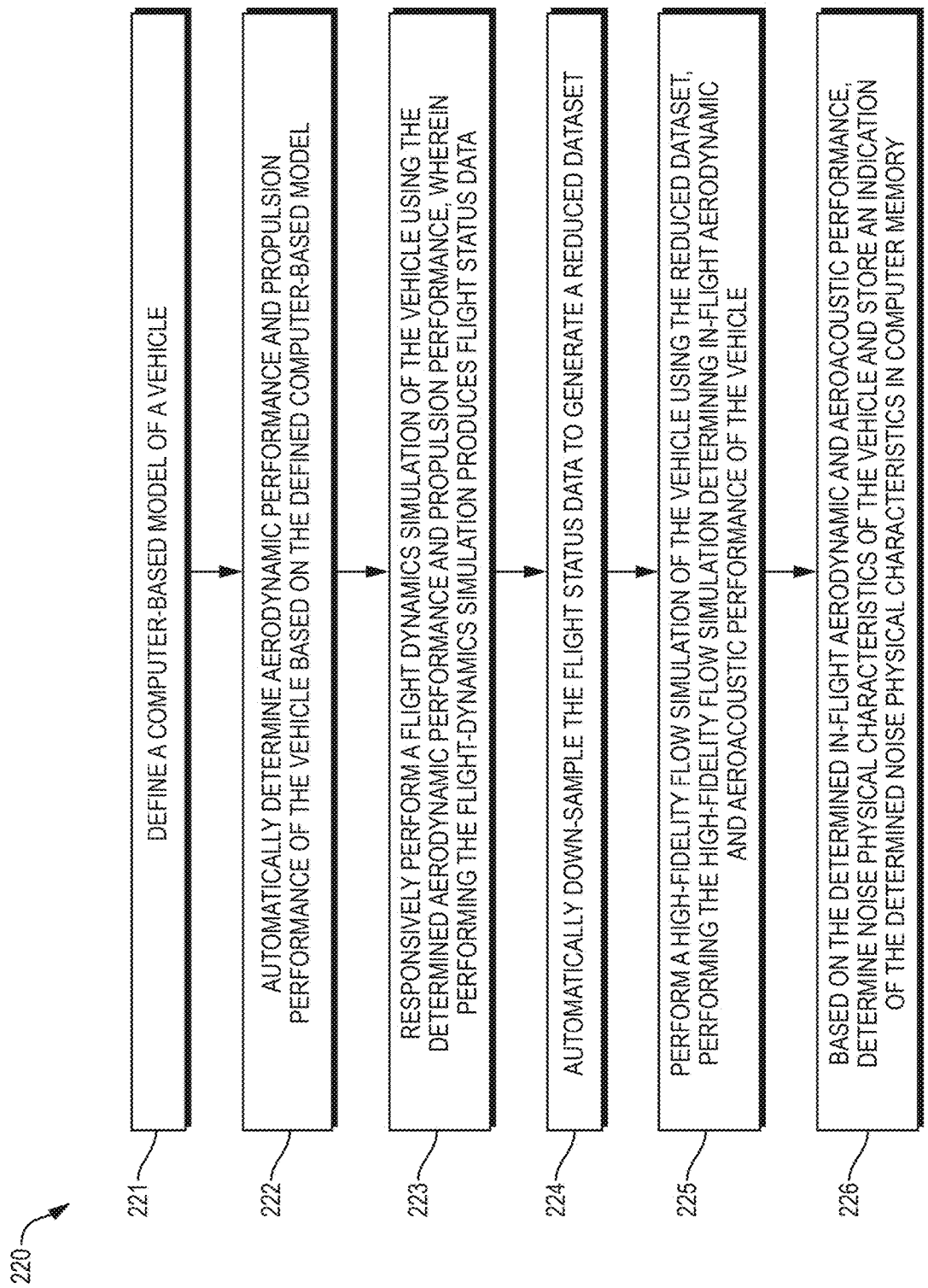
FIG. 2 is a flowchart of a method for assessing vehicle noise according to an embodiment.

FIG. 2 is a flowchart of an example method 220 for one such embodiment for assessing vehicle noise. The method 220 starts at 221 by defining a computer-based model of a vehicle and, at 222, automatically determining aerodynamic performance and propulsion performance of the vehicle based on the defined computer-based model. Responsively, a flight-dynamics simulation of the vehicle is performed at step 223 using the determined aerodynamic performance and propulsion performance determined at step 222. Performing the flight-dynamics simulation 223 produces flight status data. This flight status data may constitute a flight envelope, i.e. the equilibrium conditions along a given trajectory or flight.

This flight status data is automatically down-sampled at step 224 to generate a reduced dataset. In turn, a high-fidelity flow simulation of the vehicle is performed at step 225 using the reduced dataset, i.e., flight conditions indicated in the reduced dataset output from step 224. Performing the high-fidelity flow simulation 225 determines in-flight aerodynamic and aeroacoustic performance of the vehicle. In an embodiment, multiple high-fidelity simulations are performed at step 225 so as to determine in-flight aerodynamic and aeroacoustic performance of the vehicle for every set of flight conditions in the reduced dataset.

To continue, based on the determined in-flight aerodynamic and aeroacoustic performance, noise physical characteristics of the vehicle are determined and an indication of the determined noise physical characteristics is stored in computer memory at step 226. In an embodiment, on-ground noise is computed at step 226 for a given flight.

As noted, the method 220 is computer implemented and, as such, the functionality and effective operations, e.g., the steps 221-226, can be automatically implemented by one or more digital processors. Moreover, the method 220 can be implemented using any computer device or combination of computing devices known in the art. Amongst other examples, the method 220 can be implemented using the computer system 1100 described herein below in relation to FIG. 11 and the computer network environment 1200 described herein below in relation to FIG. 12.

An embodiment of the method 220 defines the computer-based model of the vehicle at step 221 by importing a file containing a digitized representation of geometry of the vehicle. This digitized representation may be in the form of a CAD model or discrete surface such as a tessellated geometry (stl). Further, step 221 of the method 220 may implement the functionality of step 1 described herein below in relation to FIG. 10.

Embodiments of the method 220 may create at least one of a propulsion look-up table and an aerodynamic look-up table. One such embodiment creates look-up tables of rotor thrust and torque coefficients for different values of rotor RPM and advance ratio J, which may be determined from geometry of the vehicle indicated by the computer-based model defined at step 221. These two tables, rotor thrust and torque coefficients, form the propulsion look-up table and constitute low-fidelity rotor performance input used by a flight dynamics model. In another embodiment, the aerodynamic performance of the vehicle is determined based on the defined 221 computer-based model by isolating an airframe of the vehicle from the defined computer-based model, including the aerodynamic control surfaces, and determining aerodynamic parameters from the isolated airframe and control surfaces. In turn, look-up tables of aerodynamic force coefficients are created for different values of flow angles and different values of deflection angles of the various control surfaces. These aerodynamic force coefficient look-up tables, form the aerodynamic look-up table and constitute the low-fidelity aerodynamic performance input used by a flight dynamics model.

According to an embodiment of the method 220, determining propulsion performance of the vehicle (222) based on the defined computer-based model includes, first, isolating, i.e., identifying, taking out, etc., one or more rotors of the vehicle from the defined computer-based model. Second, rotor parameters are determined from the isolated one or more rotors, e.g., by a segmentation process and analysis, after which an aerodynamic panel method is applied upon. In turn, at step 222, a propulsion look-up table is searched based on the rotor parameters to determine the propulsion performance. Similarly, embodiments can determine the aerodynamic performance of the vehicle at step 222 by isolating an airframe of the vehicle from the computer-based model defined at step 221. Such embodiments determine aerodynamic parameters from the isolated airframe, and search an aerodynamic look-up table based on the aerodynamic parameters to determine the aerodynamic performance at step 222.

Further, embodiments may implement the workflow 330, described herein below in relation to FIG. 3, or parts thereof, at step 222 to determine the aerodynamic and propulsion performance of the vehicle. Further, step 222 of the method 220 may implement the functionality of steps 2 and 3 described herein below in relation to FIG. 10 to determine the aerodynamic performance and propulsion performance of the vehicle.

An embodiment of the method 220 performs the flight-dynamics simulation of the vehicle at step 223 by first defining a travel path, e.g. a theoretical line from A to B. Such an embodiment simulates operation, e.g., by solving one or more equations of motion, of the vehicle along the travel path using the propulsion performance and aerodynamic performance determined at step 222 in order to ensure equilibrium. This simulating 223 produces flight status data of the vehicle at each of a plurality of time-steps. The flight status data at each of the plurality of time-steps is stored as the flight status data, i.e., flight envelope of the specific vehicle.

An embodiment of the method 220, at step 223, simulates operation of the vehicle along the travel path using the determined propulsion performance and aerodynamic performance by providing flight status data for a given time-step to an auto-pilot controller. In response, control input for the vehicle is received from the auto-pilot controller. The received control input is used in the simulation to produce flight status data for a time-step subsequent to the given time-step. To illustrate, consider an example where the simulation is performed at step 223 one time-step at a time. In such embodiment, at a given time step, e.g., 1-1.5 seconds, the vehicle has a particular set of properties as does the environment in which the vehicle is operating. These properties, i.e., flight status data, are provided to an autopilot controller which determines, based on the data and the desired flight path or other such specifications, that a property, e.g., rotor speed, should be modified. This modification is provided by the autopilot controller to software implementing the simulation (223) and the properties of the vehicle for the next time step, 1.5-2 seconds, are updated accordingly, i.e., rotor speed is increased.

Embodiments of the method 220 may implement the workflows 330, 440, and 550 (or parts thereof), described herein below in relation to FIGS. 3, 4, and 5, respectively, at step 223 to perform the flight-dynamics simulation producing the flight status data. Further, at step 223 embodiments may implement the functionality of step 4 of the workflow 1000 described herein below in relation to FIG. 10, to perform the flight-dynamics simulation.

In an embodiment, the flight status data produced by the simulation 223 comprises values for each of a plurality of flight parameters over-time, i.e. a discretized flight path. An embodiment of the method 220 down-samples the flight status data at step 224 to generate the reduced dataset by computing a multi-dimensional histogram using the values for each of the plurality of flight parameters over-time. In such an embodiment, the multi-dimensional histogram indicates probability of conditions during flight. An embodiment, for each non-zero-probability condition, determines a lower bound value and an upper bound value for each of the plurality of flight parameters. For each of the plurality of flight parameters, an average lower bound value and an average upper bound value is computed based on the determined lower bound value and determined upper bound value for each non-zero-probability condition. A subset of computed average lower bound values and average upper bound values is stored as the reduced dataset. According to an embodiment, the output dataset, i.e., reduced dataset is typically a few factors smaller than the input dataset, i.e., the flight status dataset.

To illustrate, consider a simplified four parameter non-limiting example, where the parameters are rotor speed, rotor tilt angle, flight Mach number, and flight angle of attack. At the beginning of the flight, the rotor speed (RPM) is, likely, at a maximum value to generate take-off lift, the tilt angle is 90 degrees (vertical axis), the Mach number is zero, and the flight angle of attack is -90 degrees (flow from top). The vehicle will remain in this condition during the entire vertical ascent, which means, that this is a condition to be considered for further noise calculations and should be down-selected for further high-fidelity flow, e.g., CFD, simulations. Once a given altitude is reached, the vehicle will start the conversion to a horizontal flight. During this stage, the Mach number will gradually increase and, likely, the rotor speed will gradually decrease. These transient flight conditions, during the conversion to horizontal flight, can generate a multitude of parameter combinations, since the engine nacelle is progressively tilted from a vertical to a horizontal setting, and the angle of attack will vary from −90 degrees to a value close to the nominal cruise value. A given number of flight conditions, say combinations of these parameters, will be down-selected for further high-fidelity CFD simulations. In cruise conditions, nominal settings are maintained by the controller and these nominal settings correspond to one (or few) conditions to be considered for further high-fidelity CFD simulations. During turns, other parameters are involved, such as control surface deflections, but the concept remains similar. Finally, during the approach phase with conversion from horizontal to vertical flight, a similar situation as in the above detailed ascending phase takes place.

Figure 10:
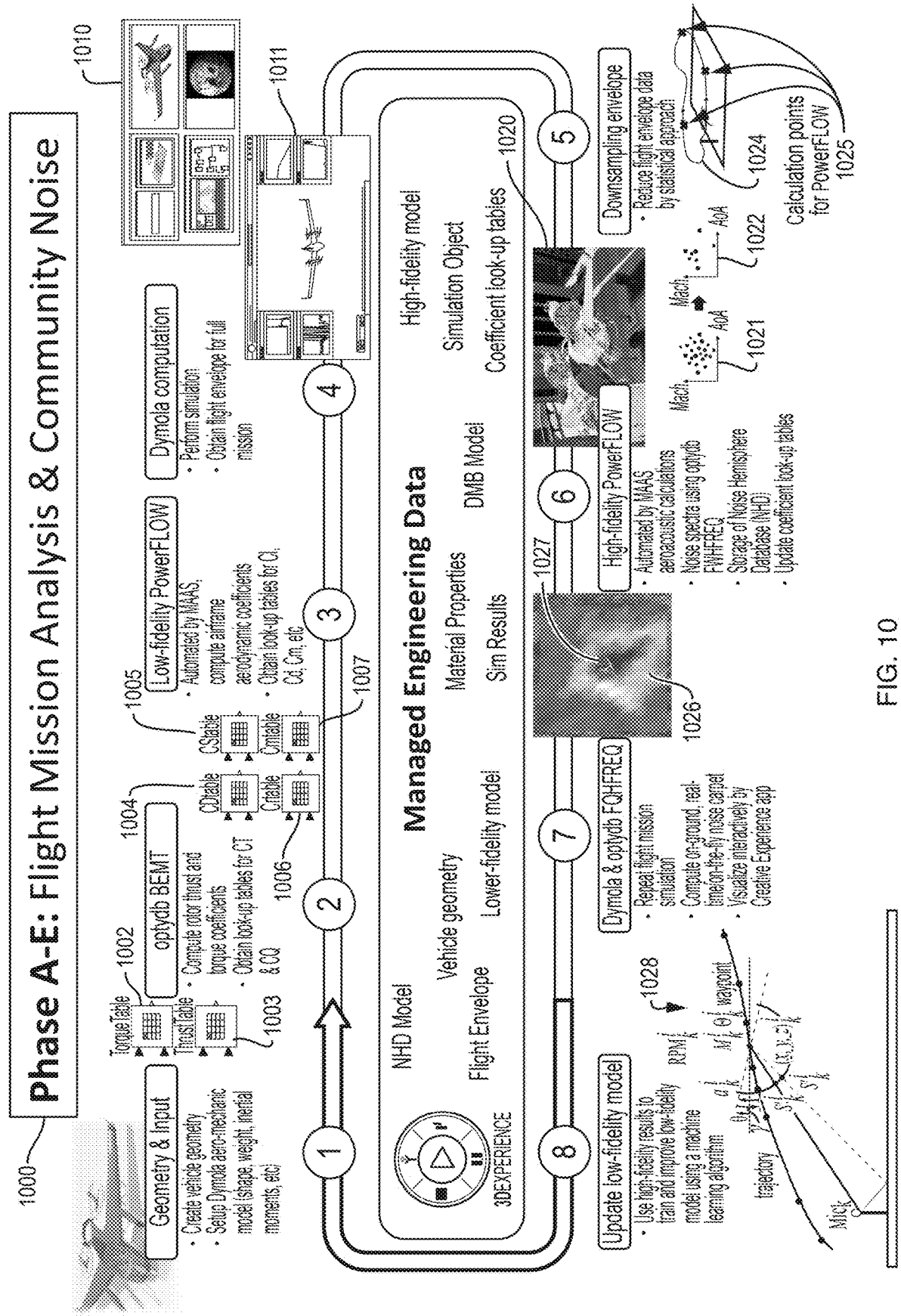
FIG. 10 is a flow diagram illustrating a method for assessing vehicle noise according to an embodiment.

Another embodiment of the method 220 determines the subset of the computed average lower bound values and average upper bound values based on the histogram indicated probability of conditions. For instance, such an embodiment may only consider conditions above a certain threshold of probability. Yet another embodiment identifies, based on the histogram and by a-priori listing exceptions based on vehicle type, an event during the flight and determines the subset of the computed average lower bound values and average upper bound values based on the identified event. For instance, such an embodiment may ensure that data for such an identified event is included in the subset by listing them a-priori depending on the vehicle type. Further, an embodiment of the method 220 implements the functionality of the workflow 770 described hereinbelow in relation to FIG. 7, at step 224, to down-sample the data and create the reduced dataset. In another embodiment, the functionality of step 5 of the workflow 1000, described hereinbelow in relation to FIG. 10, is implemented at step 224 to down-sample the flight status data.

According to an aspect of the method 220, the high-fidelity flow simulation performed at step 225 is a computational fluid dynamics simulation. In such an embodiment, the computational fluid dynamics simulation is implemented at step 225 in accordance with principles known to those of skill in the art using the reduced dataset. An embodiment of the method 220 implements the functionality of the workflow 880 described hereinbelow in relation to FIG. 8, at step 225, to perform the high-fidelity flow simulation. In another embodiment, the functionality of step 6 of the workflow 1000, described hereinbelow in relation to FIG. 10, is implemented at step 225 to perform the high-fidelity flow simulation.

Another embodiment performs testing at step 225 to determine optimized flight control parameters and/or conditions. Such an embodiment performs multiple high-fidelity flow simulations at step 225, where each high-fidelity flow simulation is performed using respective flight conditions from the reduced dataset. These respective flight conditions are different parameters being tested. Performing the multiple high-fidelity flow simulations determines in-flight aerodynamic and aeroacoustic performance of the vehicle for each of the respective flight conditions. Such an embodiment can then identify an optimized set of respective flight conditions for operating the vehicle in the real-world. For example, an embodiment of the method 220 determines noise physical characteristics of the vehicle for each of the respective flight conditions and, based on the determined noise physical characteristics of the vehicle for each of the respective flight conditions, selects given flight conditions, from amongst the respective flight conditions. For example, flight conditions may be selected that minimize noise.

Another embodiment of the method 220 collects real-world environment data from one or more sensors. Such an embodiment performs multiple high-fidelity flow simulations using respective flight conditions, the reduced dataset, and the real-world environment data collected, to determine in-flight aerodynamic and aeroacoustic performance of the vehicle subject to the respective flight conditions and the real-world environment data. In turn, noise physical characteristics of the vehicle for each of the respective flight conditions are determined. Then, based on the determined noise physical characteristics of the vehicle for each of the respective flight conditions, given flight conditions are selected from amongst the respective flight conditions. An embodiment then controls the vehicle in the real-world in accordance with the selected given flight conditions.

Yet another embodiment of the method 220 collects real-world environment data from one or more sensors and uses this data at step 226 to perform a new flight simulation. The flight conditions along the flight path are used to identify and extract corresponding noise properties computed at step 225 and stored in computer memory. From the extracted physical noise indicators, the noise radiated at one or more locations on ground is computed at step 226. By considering different flight paths or parts of them (specific maneuvers), it is possible to identify optimal operations based on noise or other performance indicators.

In an embodiment of the method 220, determining noise physical characteristics of the vehicle at step 226 comprises determining noise physical characteristics of the vehicle at multiple on-ground locations during a flight. Such an embodiment determines the noise physical characteristics at the multiple on-ground locations based upon: (i) ground topography at each point, (ii) aerodynamic performance of the vehicle at waypoints of the flight corresponding to each on-ground location (i.e., aerodynamic performance of the vehicle when it is at in-air locations substantially directly above the on-ground points), and (iii) aeroacoustic performance of the vehicle at the waypoints of the flight corresponding to each on-ground location (i.e., aeroacoustic performance of the vehicle when it is at in-air locations above the on-ground points).

Further, at step 226, an embodiment of the method 220 implements the functionality of the workflow 990 described hereinbelow in relation to FIG. 9 to determine the noise physical characteristics. According to an embodiment, the noise is determined based on the determined in-flight aerodynamic and aeroacoustic performance by utilizing a noise footprint calculation using a hemisphere approach. Determining the noise physical characteristics at step 226 may include determining the noise radiated at one or more points on ground. According to an embodiment, the process of determining the noise radiated at one or more points on ground includes tracing a ray connecting the instantaneous position of the vehicle, center of the hemisphere, and the point on ground, and interpolating the noise from the NHD at the intersection point between the ray and the hemisphere. A secondary ray can be considered if ground reflection is applied. The levels of noise interpolated from the NHD are then corrected by applying distance spreading correction, Doppler corrections, atmospheric absorption, and ground reflection. In another embodiment, the functionality of step 7 of the workflow 1000, described hereinbelow in relation to FIG. 10, is implemented at step 226 to determine the noise characteristics. According to an embodiment, the noise physical characteristics include noise Power Spectral Density levels in dB/Hz in discrete narrow frequency bands at several points on a hemisphere around the vehicle. In an embodiment, for every flight condition, i.e., combination of flight parameters, a hemisphere is stored in computer memory and tagged with the specific conditions.

Low-Fidelity Aerodynamics

Figure 3:
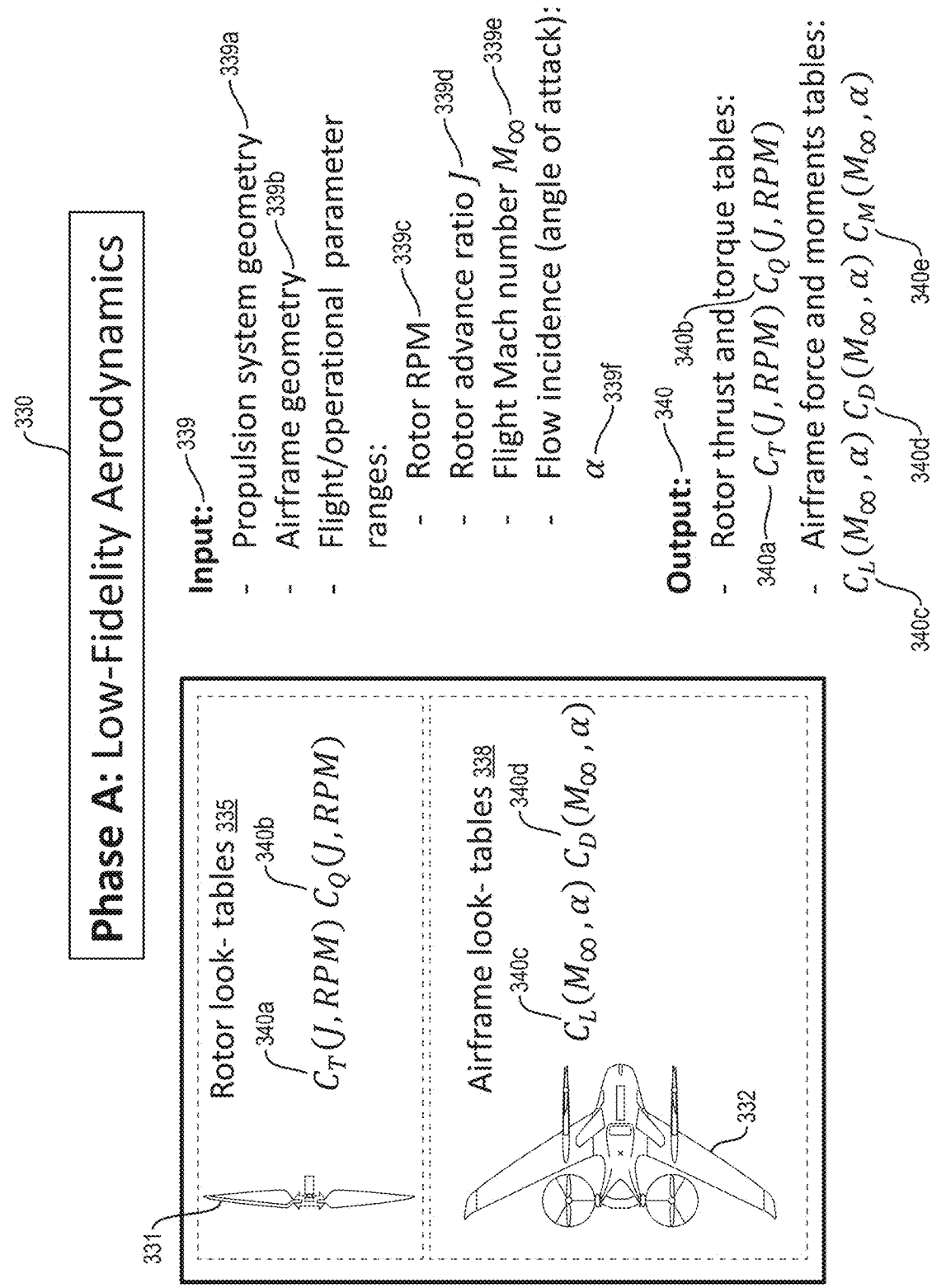
FIG. 3 is a diagram illustrating a workflow for performing a low-fidelity aerodynamics simulation in an embodiment.

Embodiments can employ a low-fidelity aerodynamics simulation workflow 330 as depicted in FIG. 3. It is noted that for simplicity, FIG. 3 shows only in-plane forces and angle of attack. In an embodiment, the low-fidelity simulation 330 performs simulations using an informed Blade Element Momentum Theory (BEMT) model for calculating rotor performance. In an embodiment, the BEMT model employed in the workflow 330 is based on standard theory with some parameters tuned on the base of high-fidelity Computational Fluid Dynamics (CFD) calculations described hereinbelow. These simulations are used to populate a rotor look-up table 335. Another embodiment of the low-fidelity simulation workflow 330 uses the Multicopter Aerodynamics and Aeroacoustics Simulation (MAAS) automatic process to generate a simulation setup for the high-fidelity CFD simulation software PowerFLOW® by Applicant-Assignee Dassault Systemes Simulia Corporation. The automation automatically controls the resolution of the computational mesh in an optimal range to produce sufficiently accurate predictions in reasonable computational turn-around times. The low-fidelity attribute of the workflow 330 does not refer to simplifications on the physical model or geometry, but refers to using a coarser mesh resolution. The results of these simulations can be used to populate the look-up tables 338. In this way, embodiments perform the simulations and store the results to be used for flight-dynamics simulations. This storage decreases processing times during future implementations.

In operation, the low-fidelity aerodynamic simulation 330 begins with input data 339 that includes propulsion system geometry 339a, airframe geometry 339b, and flight/operations parameter ranges for rotor RPM 339c, rotor advance ratio J 339d, flight Mach number $M_\infty$ 339e, and flow incidence (angle of attack) α 339f. The geometry information 339a-b and ranges for the aforementioned parameters 339c-f are then provided to simulation software as described above, or other such simulation software to determine the output 340. In an embodiment, if simulations using software have previously been previously performed, additional simulations are not performed to determine the output 340 and, instead, the look-up tables 335 and 338 are searched, given the input data 339, to determine the output 340. In an embodiment, the output 340 includes thrust coefficients $C_T$ 340a, torque coefficients $C_Q$ 340b, lift coefficients $C_L$ 340c, drag coefficients $C_D$ 340d, and moment coefficients $C_M$ 340e.

This low-fidelity simulation 330 uses the geometry of the main vehicle components, i.e., the rotor/propeller geometry 331 and the airframe geometry 332, to compute performance coefficients over a broad range of operational conditions, e.g., using a coarse mesh simulation as described above. An embodiment stores the propulsion parameters of the rotor 331 in the look up table 335 and includes the thrust and torque coefficients $C_T$ 340a and $C_Q$ 340b respectively, which depend on the number of rotations per minutes (RPM) and the advance ratio J between axial flow velocity (flight speed) and the number of root per seconds n times the rotor diameter D (J=V/n/D). The look-up table 335 indicates resulting thrust and torque coefficients 340a and 340b, respectively, given different values for RPM and J. In an embodiment, these values are stored in the look-up tables, e.g., the depicted rotor look-up table 335, for subsequent use.

The airframe 332 aerodynamic parameters are the lift and drag coefficients $C_L$ 340c and $C_D$ 340d, the side force coefficients (not shown), and the moment coefficients along the three main axes (not shown), which depend on the flight Mach number $M_\infty$, the angle of attack α, and side wind angle β. For simplicity, FIG. 3 shows only the lift 340c, drag 340d, and pitch 340e moment coefficients functions of the angle of attack. In an embodiment, the look-up table 338 stores values for the lift coefficient 340c, drag coefficient 340d, side force coefficient (not shown), and moment coefficient 340e for differing values of the flight Mach number $M_\infty$, the angle of attack α, and side wind angle β.

As such, the workflow 330 performs a simulation, e.g., a CFD simulation, using a coarse mesh with properties indicated by the input data 339. The resulting output data 340 is stored in look-up tables 335 and 338. In an embodiment, where appropriate data exists, or can be determined, e.g., through interpolation, a simulation is not performed and, instead, the look-up tables 335 and 338 are searched based on the input data 339 to determine the resulting output 340.

Flight Dynamics Modeling

Figure 4:
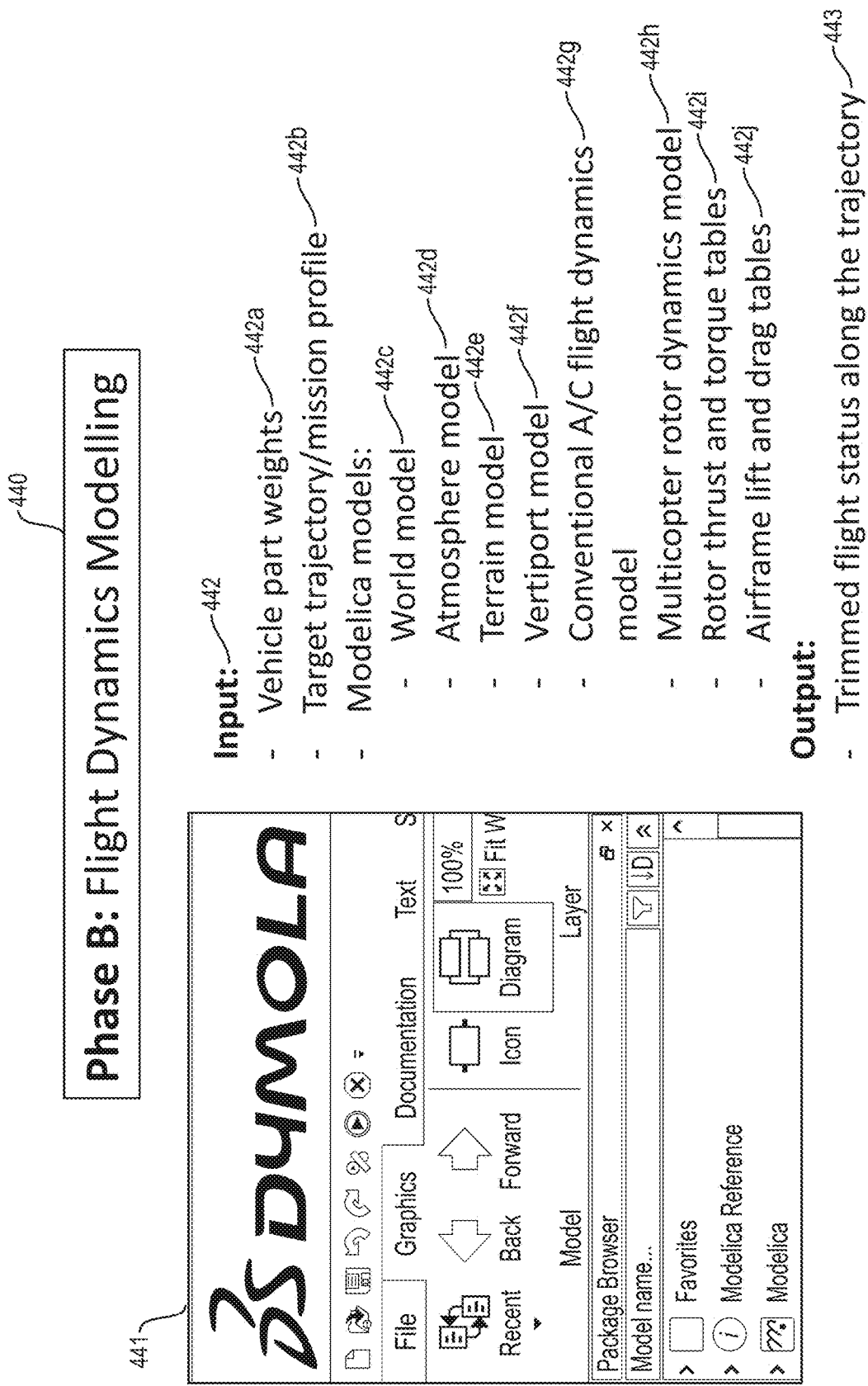
FIG. 4 depicts a workflow for flight dynamics modelling in an embodiment.

FIG. 4 illustrates a flight dynamics modeling workflow 440 according to an embodiment. The workflow 440 uses a Dassault Systèmes Dymola® Behavior Modeling (DBM) process to solve flight dynamics equations to determine non-inertial equilibrium for every point of a trajectory connecting a starting point, e.g., vertiport (point A), to a target destination (point B). Dymola® has the capability to integrate Modelica flight dynamics and rotor performance models with other Modelica models describing the operational scenario (World, Atmosphere, Terrain, Vertiport).

In the workflow 440, the interface 441 is used to provide the input data regarding the flight being simulated, by solving the flight dynamics equilibrium equations. This input data 442 includes vehicle part weights 442a, target trajectory 442b, world model 442c, atmosphere model 442d, terrain model 442e, vertiport model 442f, flight dynamics model 442g, multicopter rotor dynamics model 442h, rotor thrust and torque tables 442i and airframe lift and drag tables 442j. This input data 442 is used by the Dymola® platform to determine flight status along the trajectory 443.

In another embodiment of the workflow 440, the vehicle part weights and inertia moments required to solve the flight mechanics equations are received directly from a Dassault Systèmes CATIA® Computer Aided Design component based on the original vehicle model directly linked to Dynamic Behavior Modeling (DBM) libraries.

Figure 5:
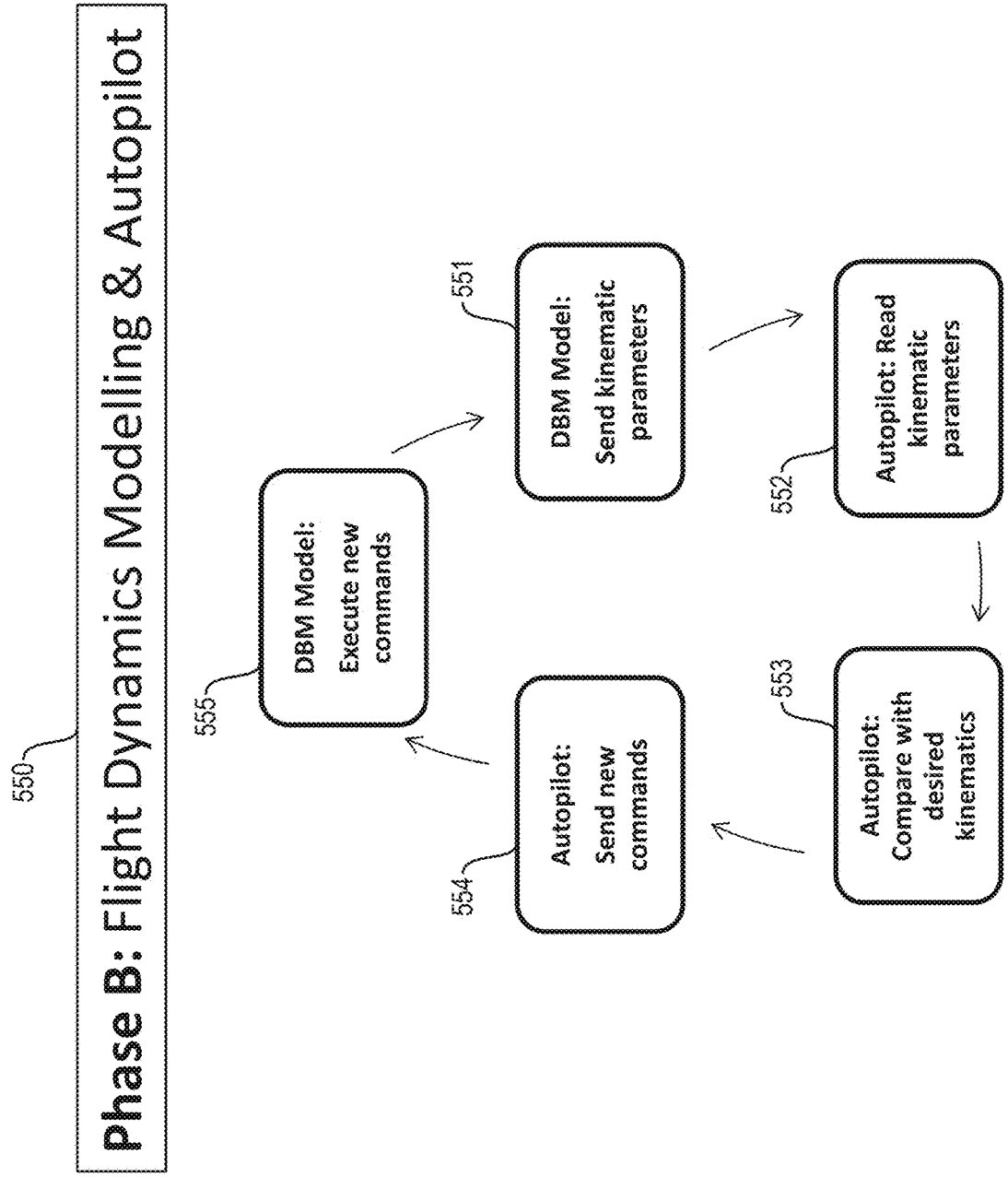
FIG. 5 is a flow diagram illustrating a workflow for flight dynamics modelling using autopilot in the loop according to an embodiment.

FIG. 5 illustrates another workflow 550 that may be used for flight dynamics modeling according to an embodiment. The workflow 550 connects the workflow 440 model (442b) with an auto-pilot calculator, e.g., a third-party autopilot calculator, that tracks a target trajectory by acting on control parameters (e.g., vehicle control surfaces and rotor RPMs) and receives flight status from the DBM model in a closed loop process according to the classical Software In the Loop (SIL) process.

In an example implementation of the workflow 550, at 551 kinematic parameters, e.g., the output 443 determined using the using the workflow 440, are provide to the autopilot calculator which reads the parameters at 552. At step 553, the autopilot calculator compares the kinematic parameters with desired kinematics to determine new actuator positions, e.g., modifications to the vehicle, which, at 554, are sent the Dymola® platform which updates the characteristics of the vehicle, e.g., the input data 440, in accordance with the new actuator positions at 555 and uses the updated data to determine kinematic parameters, returning to step 551. In this way, the avionics of the virtual model are used in a feedback loop with the DBM models to model flight dynamics of the vehicle.

Figure 6:
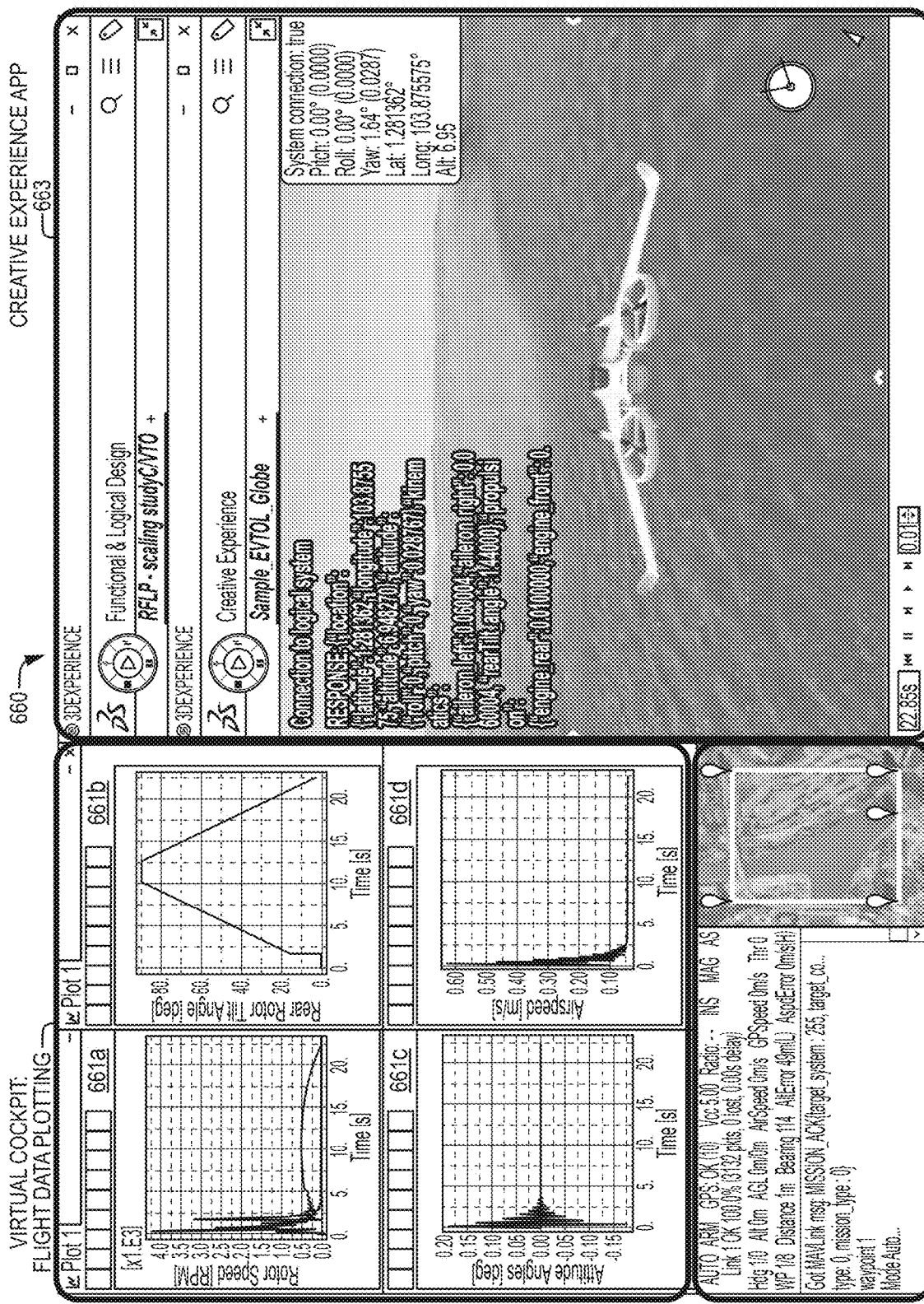
FIG. 6 depicts an example user interface that may be employed in embodiments.

In an embodiment of the workflow 550, the autopilot calculator interacts with a virtual Ground Control Station (GCS) as well as a virtual graphic cockpit model, and these graphical components are connected with the DBM and Dassault Systèmes 3D scenario visualization tool (e.g., the Creative Experience Application) in a 3DEXPERIENCE® flight mission simulator, as illustrated in FIG. 6. FIG. 6 illustrates the resulting interface 660 that acts as output visualization and includes the virtual cockpit plots 661*a-d*, for e.g. rotor speed, rotor tilt angle, attitude angle, and airspeed, respectively, GCS visualization 662, and flight simulator depictions 663.

Flight Envelope Down-Sampling

Figure 7:
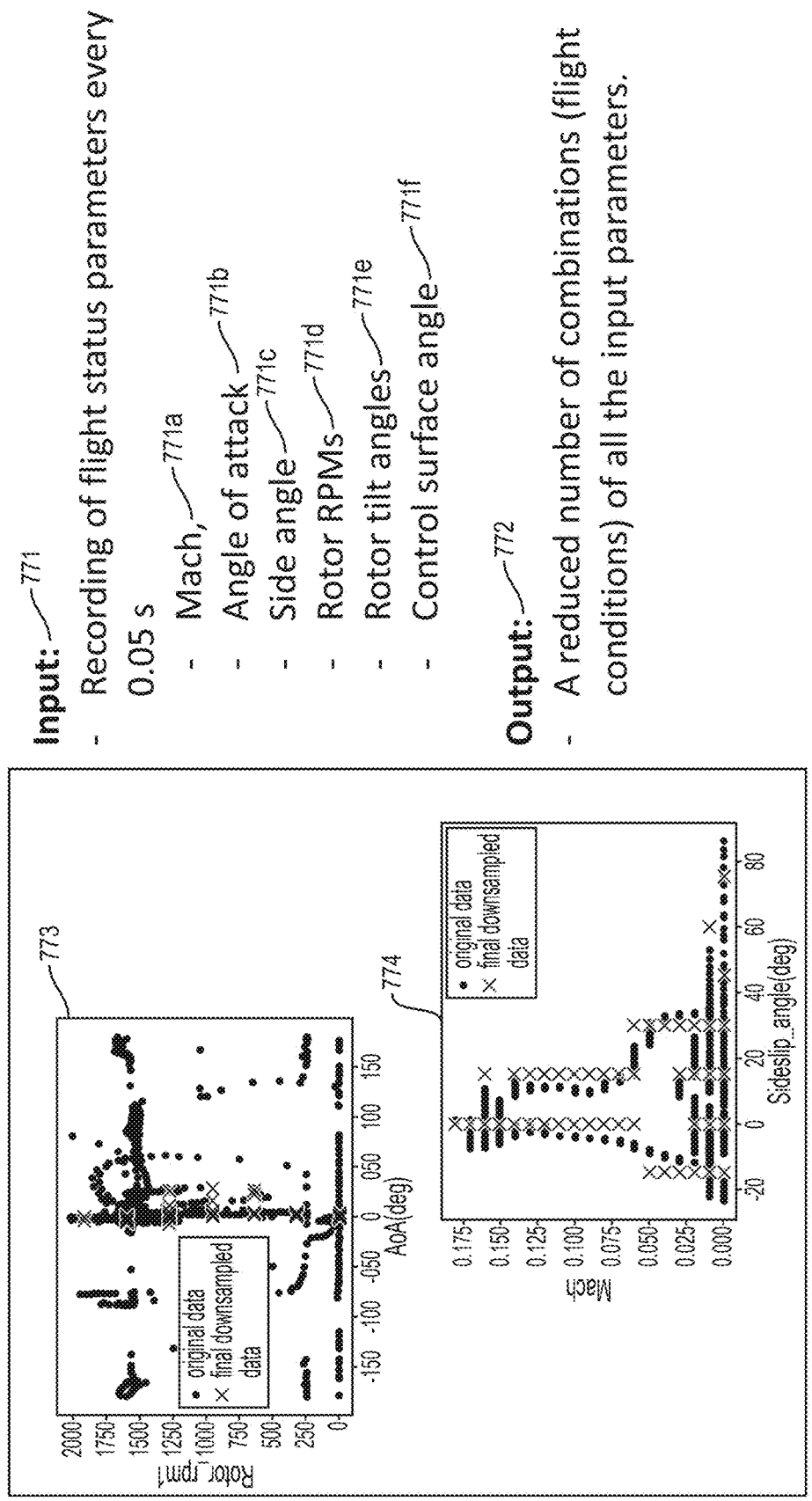
FIG. 7 illustrates a flight envelope down-sampling method that may be implemented in embodiments.

FIG. 7 illustrates a workflow 770 for down-sampling data. The workflow 770 begins with receiving flight status data (input 771) for a flight mission. In an example, the input data 771 includes values of Mach number 771*a*, angle of attack 771*b*, side wind angle 771*c*, rotor RPMs 771*d*, rotor tilt angles 771*e*, and control surface angles 771*f* sampled every 0.05 seconds. This input data 771 represents a flight envelope and the workflow 770 down-samples the flight envelope data 771 to produce a reduced number of combinations 772 of the input data 771. After the down-sampling 770, a reduced number of conditions 772 are identified for which high-fidelity simulations of the aerodynamic behavior of the vehicle are performed. In an embodiment, the down-sampling 770 includes an initial filtering and averaging of the raw data, followed by the identification of the most probable flight conditions and "corner" events based on vehicle type and prior knowledge, and finally a graphical check of the original flight envelope covering. Plots 773 and 774 illustrate the filtering where in the plots 773 and 774 the original flight status data is shown by dots and the down-sampled flight status data is shown by the crosses.

High-Fidelity Aerodynamics and Aeroacoustics

Figure 8:
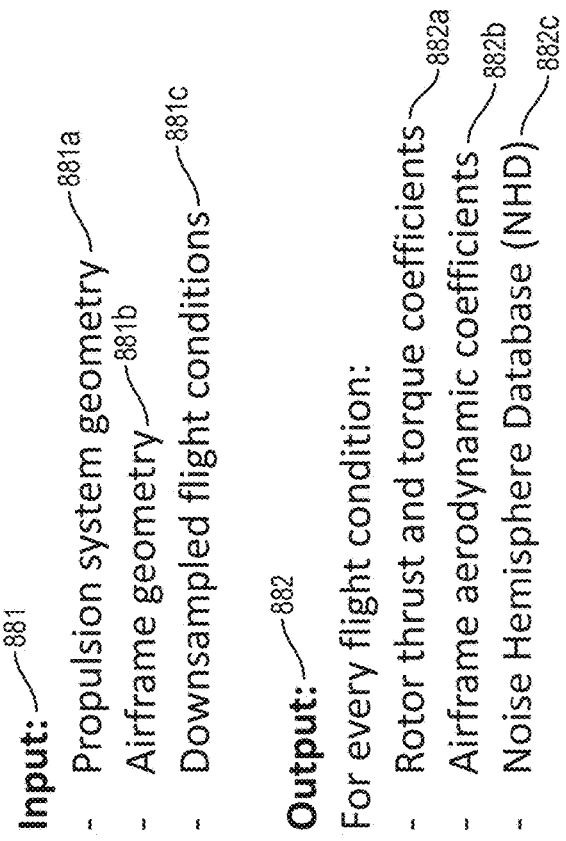
FIG. 8 illustrates a workflow for performing high-fidelity aerodynamic and aeroacoustic simulations.
Figure 8:
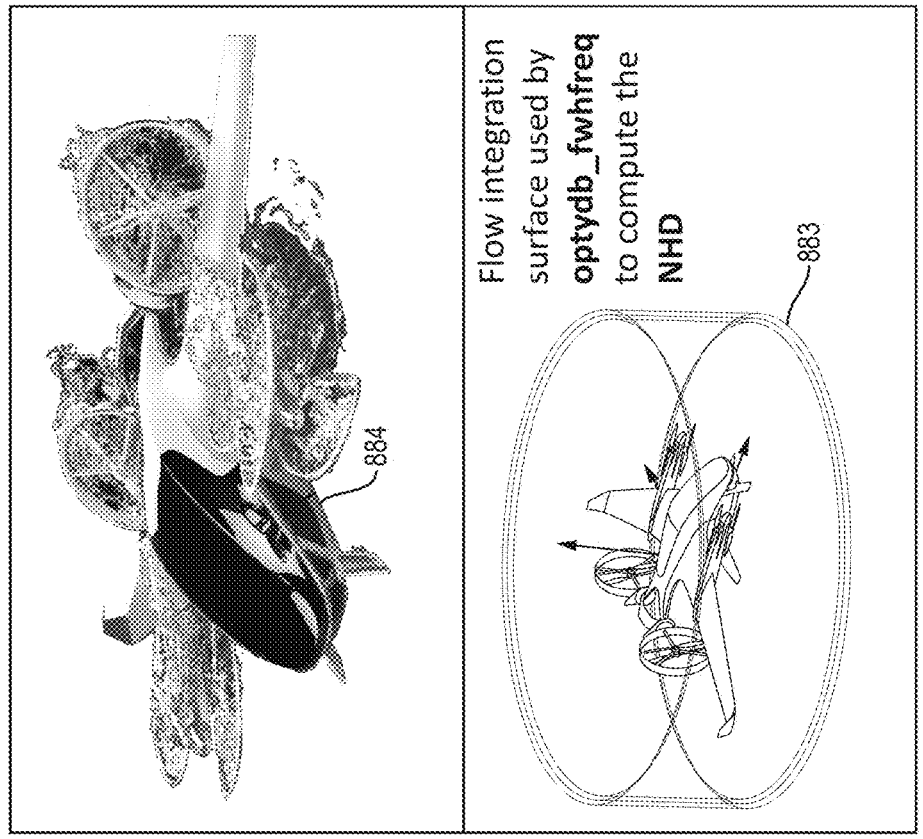

FIG. 8 illustrates a workflow 880 for performing high-fidelity aerodynamic and aeroacoustic simulations of the vehicle 884. The workflow 880 begins with the input data 881, which according to an embodiment, includes propulsion system geometry 881*a*, airframe geometry 881*b*, and down-sampled flight conditions 881*c*. The input data 881*a-c* is used to perform a high-fidelity simulation that produces the output data 882 for every flight condition from the down-sampled data 881*c*. Example output data 882 includes rotor thrust and torque coefficients 882*a*, airframe aerodynamic coefficients 882*b*, noise hemisphere data 882*c*.

In an embodiment, the workflow 880 includes scheduling and performing multiple high-fidelity aerodynamics and aeroacoustic calculations using PowerFLOW® (transient CFD flow calculation based on the Lattice-Boltzmann method) and OptydB_FOOTPRINT (far-field noise calculation by Applicant-Assignee Dassault Systemes Simulia Corporation) on a High Performance Computing (HPC) cloud system. In this embodiment, a scheduler is part of a MAAS workflow implementing an embodiment and the scheduler manages and performs data labelling and storing. In such an embodiment, for every flight condition (from the down-sampled data 881*c*), MAAS automatically creates a PowerFLOW® simulation setup, submits the job on the HPC system, and performs the data analysis. The main output of the aerodynamic calculations are forces acting on parts of the vehicle that are time-averaged and used to train the low-fidelity models used as part of the low-fidelity simulations described herein. Other outputs include flow pressure and density and velocity fluctuations over multiple surfaces around the whole vehicle. In an example embodiment, this data is used by the tool "optydb_FWHFREQ" by Applicant-Assignee Dassault Systemes Simulia Corporation to compute noise on a hemisphere of microphones distributed around the vehicle and fixed in the vehicle reference system. The tool optydb_FWHFREQ is capable of managing a large number of microphones (order of 1000), and removing spurious effects of vehicle wake crossing the integration fluid surface. The optydb_FWHFREQ tool is able to provide such features by employing a specific Ffowcs-Williams & Hawkings (FW-H) formulation that includes quadrupole noise corrections in the frequency domain. This feature, together with the average of noise spectra computed from the different layers of the integration surface (typically three layers as shown in FIG. 8 by the cylinders 883 surrounding the vehicle simulation setup) allows the workflow 880 to determine very accurate noise spectra on the hemisphere. In an embodiment, for every flight condition, spectra at all microphones on the hemisphere are exported in files and all together constitute the Noise Hemisphere Database from which noise on ground can be extrapolated.

Noise Footprint Calculation

Figure 9:
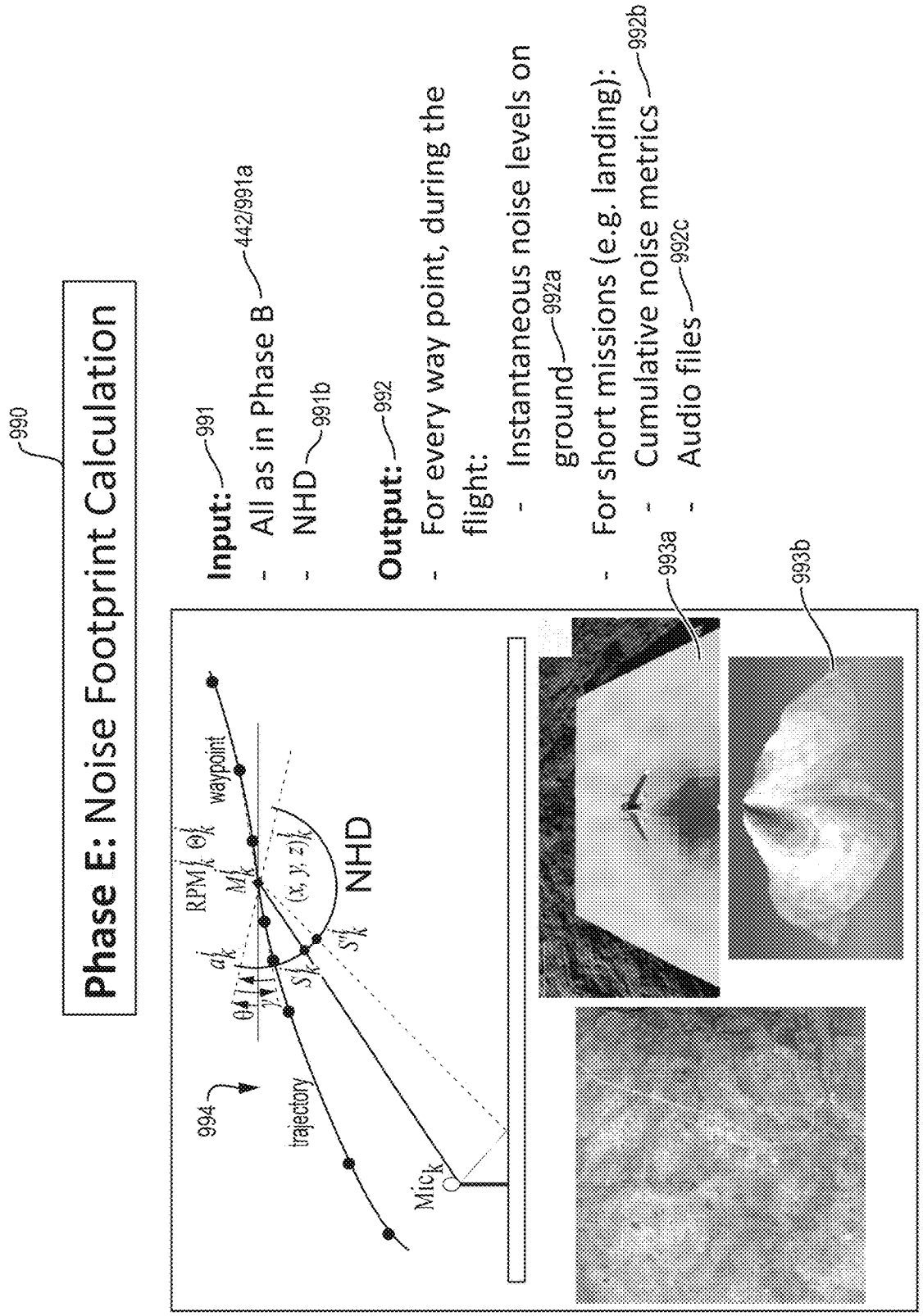
FIG. 9 depicts a noise footprint calculation that may be implemented in embodiments.

FIG. 9 illustrates a noise footprint calculation workflow 990 according to an embodiment. The workflow 990 begins with the input data 991 which includes the input data 442/991*a* from the flight dynamics workflow 440 described hereinabove in relation to FIG. 4 and the noise hemisphere database 991*b*, e.g., the output data 882*c* from the workflow 880. This input data 991 is used to produce the output noise footprint data 992. The output may include visualizations 993*a-d* that illustrate overall sound pressure level in dB integrated over a user-prescribed frequency range. According to an embodiment, the visualizations 993*a-d* are created using the noise hemisphere database technique 994. In an embodiment, the output 992 includes instantaneous noise levels on ground 992*a* for way points during a flight, cumulative noise metrics 992*b*, and audio files 992*c*.

According to an embodiment, the workflow 990 performs the flight mission simulation 440 described hereinabove in relation to FIG. 4, while every 0.5 s (or with some other desired frequency) sending the flight status to the tool optydb_FOOTPRINT. In such an implementation, the tool optydb_FOOTPRINT interpolates the corresponding noise hemisphere spectra from the three closest flight conditions contained in the NHD 991*b*. The interpolated noise hemisphere spectra are, in turn, extrapolated on ground by applying Doppler corrections, atmospheric absorption, and ground reflection/absorption to obtain the on-ground noise levels depicted in the visualizations 993*a-b* in FIG. 9. In embodiments, the noise calculation can be performed offline, by importing the flight trajectory once the flight is completed, or, the noise calculation can be performed in real-time/on-the-fly by using the last updated vehicle position. The rate of the on-the-fly noise calculation can be increased to match real-time stepping if desired.

In an embodiment, the workflow 990 advantageously extracts the on-ground points at the beginning of the calculation, for short event flights, like for instance a vehicle landing, or on-the-fly, by considering the current vehicle position. In an embodiment, the ground points are extracted from the Shuttle Radar Topography Mission (SRTM) earth topography database using a proprietary Dassault Systèmes tool that takes as input the coordinates of the vehicle, in which the noise carpet is centered, and the X and Y dimensions of the carpet. When on-the-fly noise calculations are performed, the carpet follows the vehicle and the noise levels can be visualized on the 3DEXPERIENCE® platform.

The functionality described hereinabove in relation to FIGS. 3-9 are elements that may be employed in embodiments, e.g., the method 220, to assess vehicle noise. FIG. 10 illustrates a workflow 1000 that combines the functionality described hereinabove in relation to FIGS. 3-9 to provide eVTOL flight mission analysis and community noise prediction. The workflow 1000 includes the following steps:

Step 1. Create vehicle geometry and setup a Dymola® aero-mechanic model (shape, weights, inertial moments, etc.);

Step 2. Use a low-fidelity optydb_BEMT approach to compute rotor thrust and torque coefficients to obtain look-up tables for $C_T$ and $C_Q$;

Step 3. Use a coarse PowerFLOW® setup, automated by MAAS, to compute airframe aerodynamic coefficients, and store the computed coefficients in $C_L$, $C_Q$, $C_Y$, etc., look-up tables;

Step 4. Perform Dymola®-based flight simulation and gather flight envelope along the full mission;

Step 5. Down-sample the flight envelope using a statistical approach to obtain a reduced flight envelope;

Step 6. Perform PowerFLOW® simulations for the flight conditions of the reduced flight envelope and compute the noise spectra around the vehicle using optydb_FWHFREQ. Store in an overall Noise Hemisphere Database (NHD);

Step 7. Repeat the flight mission simulation with the same trajectory or a similar one and compute the noise on ground on the fly using optydb_FOOTPRINT.

Step 8. Use the high-fidelity results to train and improve the low-fidelity results through a machine learning approach.

Referring to FIG. 10, what follows is a description of the different phases of the flight mission analysis and community noise prediction workflow 1000 according to an embodiment.

Workflow 1000—Step 1

The workflow 1000 starts at step 1 with the preparation of an eVTOL geometry of the vehicle 1001 using the computer-aided three-dimensional interactive application CATIA® suite by Dassault Systèmes. An embodiment uses a specific module of CATIA® to evaluate the mass moment of inertia of parts of the vehicle 1001, which are required by the CATIA® DBM model to solve the flight mechanics equations along the flight. In an example implementation, CATIA® and Dymola® are connected by the 3DEXPERIENCE®/CATIA®/Functional & Logical Design application by Dassault Systèmes. It is noted that while specific software applications and platforms are described herein as being employed by embodiments, embodiments are not limited to said applications and platforms and, embodiments may be implemented using any variety of known software applications and platforms.

In an embodiment, the Dymola® DBM module solves the flight mechanics system of Differential-Algebraic Equations (DAE). More specifically, Dymola® relies on "component based modeling" supported by a Graphical User Interface (GUI) where systems are described by blocks and connecting lines that represent "acausal" dependencies between components. This approach enables an easy construction of components and subsystems, similarly to how an engineer would build an actual system. Component based modeling languages enable modeling and integrating physical systems across multiple disciplines. An object-oriented paradigm is employed by Dymola® to create acausal connections between components, thus allowing information flux in all directions. The object-oriented language adopted by Dymola® is Modelica, which is an equation-based modeling language whereby declarations are given in the models through equations from first principles without the need to specify methods to compute them. Modelica is also a non-proprietary language, which has a large repository of open-source libraries across various disciplines. For the same reason, there is a large number of Modelica simulation environments that are available, both commercially and free of charge. One of the key Modelica modules adopted in an embodiment of workflow 1000 is the FlightDynamics Library developed by the German Aerospace Center (DLR). This library contains the basic components for the construction of various types of aircraft models, as well as the environment models for simulating the aircraft in operational conditions. The Modelica Standard Library, which includes the MultiBody Library, is used in conjunction with the FlightDynamics Library to model the eVTOL dynamic behavior.

A useful feature for modeling dynamic systems such as eVTOLs in Modelica is the capability to transform non-linear direct models automatically into non-linear inverse models. The inverse model of the eVTOL system is used for the trim computation and for the automatic generation of control laws, even for flexible bodies like wings. The trimming stage of the flight simulation allows the simulation to determine the status of the commands, for instance the angular deflections of actuation surfaces or the rotor RPMs, which guarantees satisfaction of dynamic equilibrium in flight.

In an embodiment, other Modelica modules are integrated in the eVTOL flight mission analysis framework to describe the operational scenario (World, Atmosphere, Terrain, Vertiport), and the modules communicate using the so-called Functional Mock-up Interface (FMI), which is a standard for co-simulation. The modules are also linked to two external (third party) components, the autopilot, which generates commands to be applied to the control surfaces and other controlling parameters, based on the difference between the actual position of the vehicle and the target reference trajectory. The commands are used by the DBM to determine the new dynamic status of the vehicle (forces and moments) and the new position after a discrete, small, time interval (e.g. 0.05 s). Another third-party component is the Ground Control Station (GCS), which facilitates defining a trajectory and visualizing the status and position of the vehicle along its mission.

For seamless utilization of the multiple tools by the framework described herein, a common platform where these tools are available is advantageous. In an example implementation of the workflow 1000, the 3DEXPERIENCE® Platform serves this purpose. In an embodiment, the tools are provided by the platform in the form of roles consisting of applications. Each of these applications has specific functionalities catered for different parts of a project, and some of the applications that share certain synergies can be used in collaboration. In an example implementation of the workflow 1000, three such applications are used to perform the processes: (1) the DBM application, (2) the Functional & Logical design application, used to interface the DBM model with the flight controller, the GCS, and 3D visualization software, and (3) the Creative Experience application used for real-time 3D visualization of the simulation.

The functional and logical application is part of the 3DEXPERIENCE® Requirement, Functional, Logical and Physical (RFLP) framework based on the V-cycle design process. Therefore, the proposed framework can be extended to a systems engineering level considering the following aspects: (i) requirement: establish criteria for verifying, validating, and qualifying the vehicle design; (ii) functional: define the services or technical function the vehicle provides to fulfill the requirements; (iii) logical: define logical architecture of the eVTOL using components, relations between components and behavior; (iv) Physical: represent virtual solution of the eVTOL.

In the proposed framework, the logical node is used for the purpose of interfacing the different components. However, the use of the functional and logical design application would allow the proposed framework to be scaled-up and cover the full product development cycle of an eVTOL.

The DBM application is able to update the position of the vehicle based on current kinematical status of the vehicle (velocity, flow angle), and values of the commands provided by the flight controller, as in a typical SIL approach (as depicted in the workflow 550). The commands are used to determine variation of forces acting on parts, for instance the thrust generated by a rotor at a given RPM and at a given advance ratio. In the workflow 1000, the aerodynamic forces acting on the airframe and generated by the rotors are supplied to the DBM via pre-computed look-up tables. Since these look-up tables cover a variety of possible operational conditions of the vehicle during its flight, these tables are created, in a first instance, by means of low-fidelity methods.

Workflow 1000—Step 2

For rotor thrust and torque, the Dassault Systèmes tool optydb_BEMT is used at step 2. The tool optydb_BEMT is based on a validated Blade Element Momentum Theory with blade sectional lift and drag coefficients computed using an embedded proprietary module. This tool optydb_BEMT has the capability to export tables of $C_T(J,RMP)$ 1003 and $C_Q(J,RPM)$ 1002 functions of the rotor advance ratio J and RPM. An example embodiment uses either a digital representation of the rotor, for instance, a triangularized stereolithography file (STL), or constructive parameters exported by a parametric CATIA® model of the blade.

Further, it is noted that in an embodiment of the workflow 1000, a simulation need not be performed at step 2 if the needed data is available in the tables 1002 and 1003 or the needed data can be derived from the tables 1002 and 1003.

Workflow 1000—Step 3

For the aerodynamic forces acting on the airframe, the low-fidelity model is supplied by the Multicopter Aerodynamics and Aeroacoustics Simulation (MAAS) workflow by Dassault Systèmes used to automatically setup simulations of complete eVTOL systems through the high-fidelity CFD software SIMULIA/PowerFLOW®. The low-fidelity attribute is related to the capability of PowerFLOW® to automatically generate a computational mesh with a value of the resolution such that the simulation cost to cover the entire flight envelope is affordable. This approach enables utilizing effective vehicle geometry rather than surrogate models of parts. Moreover, thanks to the parametrization of the setup creation, it is possible to simulate different conditions by just changing numbers in the MAAS input file. These different conditions can be used at step 3 to generate the aerodynamic force look-up tables 1004, 1005, 1006, and 1007. Moreover, it is noted that in an embodiment of the workflow 1000, simulations need not be performed at step 3 if the needed data is available in the tables 1004-1007 or the needed data can be derived from the tables 1004-1007.

Workflow 1000—Step 4

Once the aerodynamic force look-up tables 1002-1007 are available and the DBM model is available and linked to the flight-controller and GCS, it is possible to prescribe a trajectory and simulate a flight. The controller can integrate constraints, but at this stage the main interest is to fly and collect the vehicle status along its flight. This data is collected by sampling and recording the control parameters (e.g., rotor RPMs, tilt rotor angles, actuation surface angles, etc.), and flight conditions (e.g., Mach number, angle of attack, side wing angle, etc.) every 0.05 s (or with some other desired frequency) to create a dataset. This dataset is large, on the order of 10,000 of samples and depends heavily on the flight path duration and complexity. This dataset constitutes a subset of the flight envelop for a given flight mission and can include data for different stages, including: vertical take-off, conversion from vertical to horizontal flight, main flight with change of latitudes and several turns, conversion from horizontal to vertical flight, and vertical landing. The visualizations 1010 and 1011 illustrate visual output of step 4.

Workflow 1000—Step 5

Due to the high variety of conditions, the dataset collected at step 4 is quite large. The workflow 1000 addresses the size of the dataset (e.g., the data of the flight path, i.e., trajectory 1024 with points 1025 of the vehicle, e.g., points for which noise is calculated) at step 5 by down-sampling the flight envelop dataset and defining sample conditions, as visually indicated at step 5. Embodiments can perform the down-sampling based on a variety of different considerations. For instance, embodiments can identify sample conditions based on occurrence rate (histogram) or condition specificity based on load, and, thus, noise conditions (corner events).

With these two criteria, occurrence rate and condition specificity, it is possible to define a prescribed number of flight conditions to be used for high-fidelity aerodynamic and aeroacoustic simulations. Prior to constructing histograms, an embodiment forces the value of the angle of attack to a zero value whenever the Mach number is below a certain threshold value, and averages the high-frequency sample over a large time window of 0.5 s. This allows filtering out singular events, which are not representative of an average dynamic behavior and improves robustness of the down-sampling process. This filtering is illustrated in the plots 1021 and 1022 where the plot 1021 shows the original data and the plot 1022 shows the filtered data.

According to an embodiment, the histogram-based process for down-sampling at step 5 of the workflow 1000 includes the following steps: (i) Divide the value range of each parameter based on step values given by a user, (ii) Calculate the multi-dimensional histogram, and the probability of all the interval combinations, (iii) Search for non-zero-probability conditions and save their indices, (iv) Loop through the non-zero probability conditions and collect the lower and upper boundary parameter values of these conditions, (v) Compute the average values of those lower and upper boundaries and save them to an output file. Embodiments can also consider flight corner events regardless of their probability in order to better define the boundaries of the flight envelop.

Workflow 1000—Step 6

At step 6 a high-fidelity simulation is performed using the down-sampled dataset produced at step 5. Depending on the available computational resources, a given number of flight conditions (parameter combinations) taken from the ranked subset (down-sampled dataset) are considered. The considered flight conditions are used to automatically setup a high-fidelity PowerFLOW® simulation using MAAS, that includes both the airframe and the rotors of the vehicle 1020 operated at specific values of the RPM. The high-fidelity simulation at step 6 is implemented by scheduling multiple jobs in a HPC system, monitoring status of jobs using a cloud-based GUI, and labeling and storing the simulation results. In an embodiment, a high-level of automation of MAAS is achieved through the use of the optydb_PFROTOR tool by Applicant-Assignee Dassault Systemes Simulia Corporation, which facilitates extracting the constructive parameters from the rotor geometry that are needed to generate a suitable computational mesh around the rotors.

The PowerFLOW® transient flow calculations deliver unsteady aerodynamic forces on the different parts of the vehicle as well as flow variables (pressure, density and velocity components) on a multi-layer sampling surface around the vehicle. One large file of several hundreds of Giga Bytes per run is generated that contains all time steps. The physical time covered by every simulation is typically 10 to 20 rotor revolutions. The sampling rate is in the order of 1000 BPF/B, where BPF is the Blade Passing Frequency, say the rotational frequency multiplied by the number of rotor blades B. The noise generated by the vehicle is computed on-the-fly (and not in post-processing as is typically done) using the frequency-domain FW-H tool optydb_FWHFREQ.

By using this approach embodiments can compute the noise spectra on the order of a thousand microphones on a hemisphere around the vehicle in a much more efficient way than using a time-domain approach. In order to save storage space, users can decide to activate an option that automatically deletes the FW-H flow input file at the end of a simulation. In addition to the on-the-fly capability, the FW-H model is also able to reduce the spurious influence of vortical wakes crossing the integration surface. This is accomplished using two concurrent techniques. The first technique uses multiple adjacent integration surfaces (typically three) and averages the complex acoustic spectra. The second technique uses a formulation that takes into account the otherwise missing volume source contribution, through an additional surface integral that approximates the missing volume integral.

The noise spectra at every microphone M on the hemisphere are stored as narrow-band Power Spectral Density values PSD(f,M). The ensemble of all files for the down sample flight envelop data constitutes the Noise Hemisphere Database (NHD) used for noise footprint calculations in step 7 of the workflow.

In an embodiment, the unsteady aerodynamic force signals exported by each run of the simulation are averaged in time to get steady-state aerodynamic coefficients on the airframe and thrust/torque rotor coefficients. These values are used to construct a corrective meta-model to be applied to the low-fidelity models. According to an embodiment, two different approaches are pursued for the rotor and the airframe. For the rotor, a machine-learning based algorithm is used to modify tuning parameters in the BEMT model, for instance, topic corrections factors, and 3D correction factors for the sectional lift and drag coefficients. For the airframe component, the main error is related to the absence of the rotating components in the low-fidelity calculations and, as such, the effects of the rotor induced flow are evaluated by a subtraction logic and used to feed a heuristic corrective model. The corrected low-fidelity model can be used in step 8 of the workflow.

Workflow 1000—Step 7

Step 7 of the workflow 1000 comprises repeating the flight mission using the same DBM model as in step 6. However, improved look-up tables for the aerodynamic forces are used at step 7. Optionally, different trajectories can be defined, provided that the different trajectories correspond to a similar flight envelop as calculated before. In an embodiment, the flight-controller can be replaced by a human pilot in a flight simulation Human In the Loop (HIL) modality. Further, at step 7, two different scenarios can be considered for the noise calculation: (i) focus on a fixed area on ground, fixed during the flight event and (ii) focus on a moving area on ground, following the vehicle ground projection during the flight.

In both cases, the noise carpet, i.e., a grid of on-ground microphones, is extracted from a discrete representation of the Earth from the Shuttle Radar Topography Mission (SRTM) database based on latitude/longitude coordinates. This operation is accomplished through a tool that exports the coordinates as a point of clouds or tessellated surface in Universal Transverse Mercator (UTM) format readable by the noise footprint calculation tool optydb_FOOTPRINT. In the first case (fixed area on ground), the carpet extraction is performed only once at the beginning of the flight mission analysis, while in the second case (focus on moving area), the extraction is carried out every discrete time. Another difference between these two analysis modalities is that, in the first case, time-cumulative noise metrics like Sound Exposure Level (SEL) and Effective Perceived Noise Level (EPNL) can be computed at the end of the flight event. This approach is particularly useful to optimize specific phases of the flight, for instance take-off and landing.

The noise calculation can be executed after the flight simulation, using the trajectory waypoints and the operational conditions (parameter combinations) at every waypoint, or during the flight, using the last waypoint and corresponding operational conditions. Depending on the available computational power and the time-step used for the noise calculation, which can be much larger than the actual flight simulation time step, the flight simulation and noise calculation can be executed in real-time, either in SIL or HIL modality. Step 7 can also create a visualization 1026 where the contours, i.e., shading, indicates different on-ground noise levels below the vehicle 1027. In an embodiment, the visualization 1026 is generated using the noise calculation technique 1028.

In an embodiment, the optydb_FOOTPRINT tool performs to following operations in order to compute the noise at ground microphones. First, the NHD is imported and stored in memory. Second, for every combination of flight parameters corresponding to a waypoint, the three closest conditions stored in the NHD are determined through a suitable multi-dimensional distance. Third, the equivalent noise hemisphere is interpolated from the NHD. Fourth, the noise map calculation is distributed among multiple cores. Fifth, the hemisphere is rotated to take into account the instantaneous Euler angles of the vehicle. Sixth, the intersection point between the rotated hemisphere and the ray connecting the retarded position of the vehicle (at the emission time) and the point on ground is calculated. Seventh, the noise on the intersection point is interpolated from the hemisphere microphones. Eighth, the noise PSD from the hemisphere to ground is extrapolated by applying corrections to take into account the atmospheric absorption depending on distance, frequency, air humidity, the Doppler amplitude and frequency corrections (depending on the Mach number projection along the radiation direction), and ground absorption and reflection (depending on the sound absorption properties of the terrain). Ninth, a noise visualization metric is computed. For instance, the Overall Sound Pressure Level (OSPL) at every microphone on ground is computed. Tenth, a noise map is composed that can be projected on the terrain and visualized in the Creative Experience application. On-ground noise PSD for every discrete time is also stored in files and can be used for off-line noise metric calculations like SEL or EPNL.

Workflow 1000—Step 8

At step 8 of the workflow 1000 high-fidelity results are used to train and improve low-fidelity models used at steps 2 and 3. An embodiment uses a machine-learning method to implement this training so that in future better look up tables can be created.

Embodiments provide computational methodologies and systems that perform community noise assessments of vehicles in realistic operational conditions. Embodiments are based on a flight mission analysis that solves the aeromechanical dynamic equilibrium of the vehicle along its flight. A software-in-the-loop strategy with an automatic controller can be used to track a user-prescribed flight path. The aerodynamic forces generated by the flow on the airframe and the thrust/torque generated by every rotor at a value of the RPM set by the controller, are evaluated by the aeromechanical solver from look-up tables. In order to cover a broad range of operational conditions, the look-up tables are computed using low-fidelity methods. During the simulated flight, an entire set of flight parameters is recorded at a high rate (e.g. 0.05 s). After the first flight, a procedure based on statistical arguments is used to reduce the number of flight conditions to a set of representative, user-prescribed number of, conditions. These conditions are used to perform high-fidelity full-vehicle aerodynamic and aeroacoustic calculations using an automated process for simulation pre-processing, execution, and post-processing. The high-fidelity noise spectra on a hemisphere around the vehicle, computed during the aerodynamic simulation, are stored in a database for further on-ground noise calculations. The high-fidelity aerodynamic results are used to correct the low-fidelity look-up tables for further flight simulations. Finally, a new flight mission is simulated, which can be different from the first one, and the instantaneous flight status is used to calculate the noise on ground from the precomputed noise database.

The acoustic calculation can be done in post-processing after the flight is completed, or during the flight (on-the-fly analysis). The rate of the acoustic calculation can be adjusted in such a way that the on-ground noise can be calculated and visualized in real time. The noise maps can be computed on a fixed ground patch extracted at the beginning of the flight simulation from the Earth topography database, or on a ground patch following the vehicle along its flight and extracted at every time step of the noise calculation from the Earth topography database.

Computer Support

Figure 11:
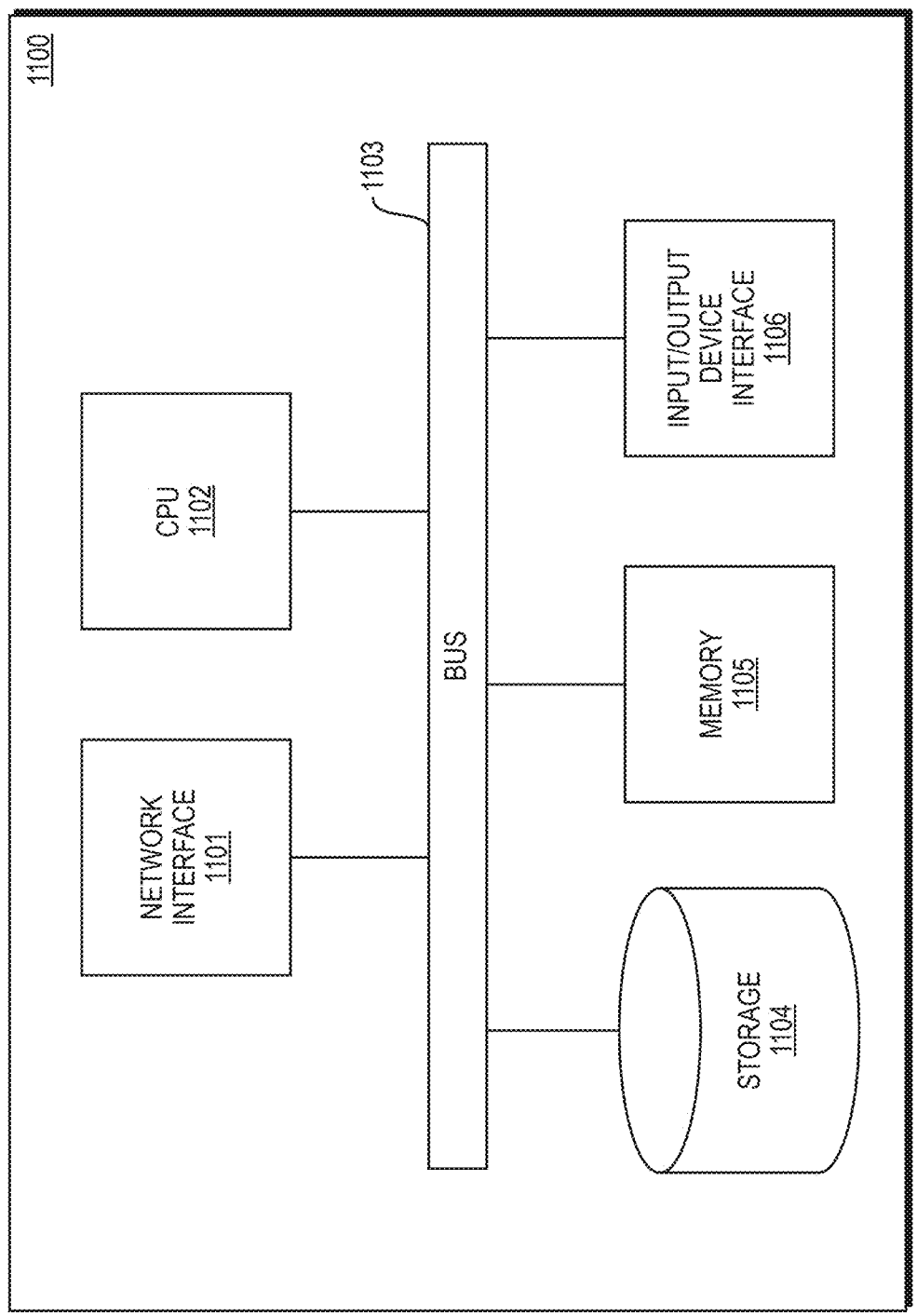
FIG. 11 is a simplified block diagram of a computer system embodiment for determining vehicle noise.

FIG. 11 is a simplified block diagram of a computer-based system 1100 that may be used to implement any variety of the embodiments of the present invention described herein. The system 1100 comprises a bus 1103. The bus 1103 serves as an interconnect between the various components of the system 1100. Connected to the bus 1103 is an input/output device interface 1106 for connecting various input and output devices such as a keyboard, mouse, display, speakers, etc. to the system 1100. A central processing unit (CPU) 1102 is connected to the bus 1103 and provides for the execution of computer instructions implementing embodiments. Memory 1105 provides volatile storage for data used for carrying out computer instructions implementing embodiments described herein, such as those embodiments previously described hereinabove. Storage 1104 provides non-volatile storage for software instructions, such as an operating system (not shown) and embodiment configurations, etc. The system 1100 also comprises a network interface 1101 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 1100, or a computer network environment such as the computer environment 1200, described herein below in relation to FIG. 12. The computer system 1100 may be transformed into the systems that execute the methods (e.g., 220, 330, 440, 550, 770, 880, 990, 1000) described herein, for example, by loading software instructions into either memory 1105 or non-volatile storage 1104 for execution by the CPU 1102. One of ordinary skill in the art should further understand that the system 1100 and its various components may be configured to carry out any embodiments or combination of embodiments of the present invention described herein. Further, the system 1100 may implement the various embodiments described herein utilizing any combination of hardware, software, and firmware modules operatively coupled, internally, or externally, to the system 1100.

Figure 12:
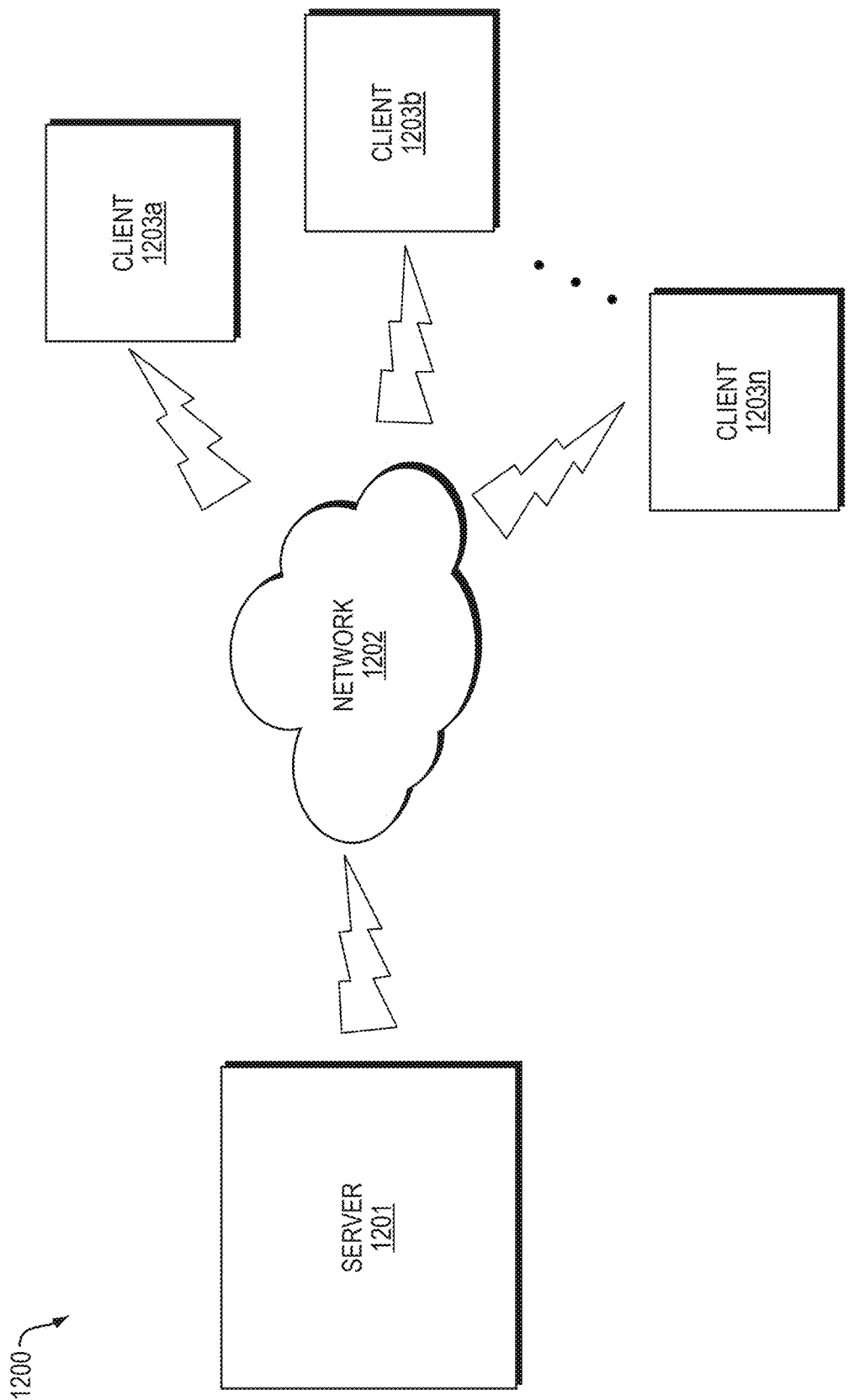
FIG. 12 is a simplified diagram of a computer network environment in which embodiments of the present invention may be implemented.

FIG. 12 illustrates a computer network environment 1200 in which an embodiment of the present invention may be implemented. In the computer network environment 1200, the server 1201 is linked through the communications network 1202 to the clients 1203a-n. The environment 1200 may be used to allow the clients 1203a-n, alone or in combination with the server 1201, to execute any of the embodiments described herein. For non-limiting example, computer network environment 1200 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

For example, the foregoing description and details of embodiments in the figures reference Applicant-Assignee (Dassault Systemes Simulia Corporation) and Dassault Systemes, tools and platforms, for purposes of illustration and not limitation. Other similar tools and platforms are suitable.

What is claimed is:

1. A computer-implemented method for determining vehicle noise physical characteristics, the method comprising:
   defining a computer-based model of a vehicle capable of flight;
   automatically determining aerodynamic performance and propulsion performance of the vehicle based on the defined computer-based model;
   responsively performing a flight-dynamics simulation of the vehicle using the determined aerodynamic performance and propulsion performance, wherein performing the flight-dynamics simulation produces flight status data;
   automatically and probabilistically down-sampling the flight status data to generate a reduced dataset;
   performing a high-fidelity flow simulation of the vehicle using the reduced dataset, performing the high-fidelity flow simulation determining in-flight aerodynamic and aeroacoustic performance of the vehicle; and
   based on the determined in-flight aerodynamic and aeroacoustic performance, determining noise physical characteristics of the vehicle and storing an indication of the determined noise physical characteristics in computer memory, wherein the performing a high-fidelity flow simulation and determining noise physical characteristics are automatically implemented by one or more digital processors.

2. The method of claim 1 wherein defining the computer-based model of the vehicle comprises:
   importing a file containing a digitized representation of geometry of the vehicle.

3. The method of claim 1 wherein determining aerodynamic performance and propulsion performance of the vehicle based on the defined computer-based model comprises:
   isolating one or more rotors of the vehicle from the defined computer-based model;
   determining rotor parameters from the isolated one or more rotors;
   computing a propulsion look-up table based on the rotor parameters to determine the propulsion performance;
   isolating an airframe of the vehicle from the defined computer-based model;
   determining aerodynamic parameters from the isolated airframe; and
   computing an aerodynamic look-up table based on the aerodynamic parameters to determine the aerodynamic performance.

4. The method of claim 3 further comprising:
   creating and storing in computer memory at least one of: the propulsion look-up table and the aerodynamic look-up table.

5. The method of claim 1 wherein performing the flight-dynamics simulation of the vehicle comprises:
   defining a travel path;
   simulating operation of the vehicle along the travel path using the determined propulsion performance and aerodynamic performance, wherein simulating the operation produces flight status data at each of a plurality of time-steps; and
   storing the flight status data at each of the plurality of time-steps as the flight status data.

6. The method of claim 5 wherein simulating operation of the vehicle along the travel path using the determined propulsion performance and aerodynamic performance comprises:
   providing flight status data for a given time-step to an auto-pilot controller;
   responsively receiving control input for the vehicle from the auto-pilot controller; and
   using the received control input in the simulating to produce flight status data for a time-step subsequent to the given time-step.

7. The method of claim 1 wherein the flight status data comprises values for each of a plurality of flight parameters over-time.

8. The method of claim 7 wherein probabilistically down-sampling the flight status data to generate the reduced dataset comprises:
   computing a multi-dimensional histogram using the values for each of the plurality of flight parameters over-time, wherein the multi-dimensional histogram indicates probability of conditions during flight;
   for each non-zero-probability condition, determining a lower bound value and an upper bound value for each of the plurality of flight parameters;
   for each of the plurality of flight parameters, computing an average lower bound value and an average upper bound value based on the determined lower bound value and determined upper bound value for each non-zero-probability condition; and
   storing a subset of computed average lower bound values and average upper bound values as the reduced dataset.

9. The method of claim 8 further comprising:
   determining the subset of the computed average lower bound values and average upper bound values based on the histogram indicated probability of conditions.

10. The method of claim 9 further comprising:
    based on the histogram, identifying an event during the flight; and
    determining the subset of the computed average lower bound values and average upper bound values based on the identified event.

11. The method of claim 1 wherein the high-fidelity flow simulation is a computational fluid dynamics (CFD) simulation.

12. The method of claim 1 wherein performing the high-fidelity flow simulation of the vehicle comprises:
    performing multiple high-fidelity flow simulations, each high-fidelity flow simulation performed using respective flight conditions from the reduced dataset, to determine in-flight aerodynamic and aeroacoustic performance of the vehicle for each of the respective flight conditions.

13. The method of claim 12 further comprising:
determining noise physical characteristics of the vehicle for each of the respective flight conditions; and
based on the determined noise physical characteristics of the vehicle for each of the respective flight conditions, selecting given flight conditions, from amongst the respective flight conditions.

14. The method claim 1 further comprising:
from one or more sensors, collecting real-world environment data;
performing multiple high-fidelity flow simulations, each high-fidelity flow simulation performed using respective flight conditions, the reduced dataset, and the real-world environment data collected, to determine in-flight aerodynamic and aeroacoustic performance of the vehicle subject to the respective flight conditions and the real-world environment data;
determining noise physical characteristics of the vehicle for each of the respective flight conditions;
based on the determined noise physical characteristics of the vehicle for each of the respective flight conditions, selecting given flight conditions, from amongst the respective flight conditions; and
controlling the vehicle in accordance with the selected given flight conditions.

15. The method of claim 1 wherein determining noise physical characteristics of the vehicle comprises:
determining noise physical characteristics of the vehicle at multiple on-ground locations during a flight, wherein the noise physical characteristics at the multiple on-ground locations are determined based upon: (i) ground topography at each on-ground location, (ii) aerodynamic performance of the vehicle at waypoints of the flight corresponding to each on-ground location, and (iii) aeroacoustic performance of the vehicle at the waypoints of the flight corresponding to each on-ground location.

16. A computer system for determining vehicle noise physical characteristics, the system comprising:
a processor; and
a memory with computer code instructions stored thereon, the processor and the memory, with the computer code instructions, being configured to cause the system to:
define a computer-based model of a vehicle capable of flight;
automatically determine aerodynamic performance and propulsion performance of the vehicle based on the defined computer-based model;
responsively perform a flight-dynamics simulation of the vehicle using the determined aerodynamic performance and propulsion performance, wherein performing the flight-dynamics simulation produces flight status data;
automatically and probabilistically down-sample the flight status data to generate a reduced dataset;
perform a high-fidelity flow simulation of the vehicle using the reduced dataset, performing the high-fidelity flow simulation determining in-flight aerodynamic and aeroacoustic performance of the vehicle; and
based on the determined in-flight aerodynamic and aeroacoustic performance, determine noise physical characteristics of the vehicle and store an indication of the determined noise physical characteristics in computer memory.

17. The system of claim 16 wherein, in performing the flight-dynamics simulation of the vehicle, the processor and the memory, with the computer code instructions, are configured to cause the system to:
define a travel path;
simulate operation of the vehicle along the travel path using the determined propulsion performance and aerodynamic performance, wherein simulating the operation produces flight status data at each of a plurality of time-steps; and
store the flight status data at each of the plurality of time-steps as the flight status data.

18. The system of claim 16 wherein, the flight status data comprises values for each of a plurality of flight parameters over-time and where, in probabilistically down-sampling the flight status data to generate the reduced dataset, the processor and the memory, with the computer code instructions, are configured to cause the system to:
compute a multi-dimensional histogram using the values for each of the plurality of flight parameters over-time, wherein the multi-dimensional histogram indicates probability of conditions during flight;
for each non-zero-probability condition, determine a lower bound value and an upper bound value for each of the plurality of flight parameters;
for each of the plurality of flight parameters, compute an average lower bound value and an average upper bound value based on the determined lower bound value and determined upper bound value for each non-zero-probability condition; and
store a subset of computed average lower bound values and average upper bound values as the reduced dataset.

19. The system of claim 16 wherein, in determining noise physical characteristics of the vehicle, the processor and the memory, with the computer code instructions, are configured to cause the system to:
determine noise physical characteristics of the vehicle at multiple on-ground locations during a flight, wherein the noise physical characteristics at the multiple on-ground locations are determined based upon: (i) ground topography at each on-ground location, (ii) aerodynamic performance of the vehicle at waypoints of the flight corresponding to each on-ground location, and (iii) aeroacoustic performance of the vehicle at the waypoints of the flight corresponding to each on-ground location.

20. A computer program product for determining vehicle noise physical characteristics, the computer program product comprising:
one or more non-transitory computer-readable storage devices and program instructions stored on at least one of the one or more storage devices, the program instructions, when loaded and executed by a processor, cause an apparatus associated with the processor to:
define a computer-based model of a vehicle capable of flight;
automatically determine aerodynamic performance and propulsion performance of the vehicle based on the defined computer-based model;
responsively perform a flight-dynamics simulation of the vehicle using the determined aerodynamic performance and propulsion performance, wherein performing the flight-dynamics simulation produces flight status data;

automatically and probabilistically down-sample the flight status data to generate a reduced dataset;

perform a high-fidelity flow simulation of the vehicle using the reduced dataset, performing the high-fidelity flow simulation determining in-flight aerodynamic and aeroacoustic performance of the vehicle; and based on the determined in-flight aerodynamic and aeroacoustic performance, determine noise physical characteristics of the vehicle and store an indication of the determined noise physical characteristics in computer memory.

\* \* \* \* \*